US012738046B2

(12) United States Patent
Jozsa et al.

(10) Patent No.: US 12,738,046 B2
(45) Date of Patent: Sep. 15, 2026

(54) LOCALIZATION BY A NEURAL NETWORK

(71) Applicant: Nokia Solutions and Networks Oy, Espoo (FI)

(72) Inventors: Csaba Mate Jozsa, Budapest (HU); Gábor Sörös, Budapest (HU); Krisztián Zsolt Varga, Budapest (HU); Lóránt Farkas, Budapest (HU)

(73) Assignee: Nokia Solutions and Networks Oy, Espoo (FI)

( * ) Notice: Subject to any disclaimer, the term of this patent is extended or adjusted under 35 U.S.C. 154(b) by 229 days.

(21) Appl. No.: 18/639,763

(22) Filed: Apr. 18, 2024

(65) Prior Publication Data

US 2024/0362905 A1 Oct. 31, 2024

(30) Foreign Application Priority Data

Apr. 26, 2023 (FI) ...................................... 20235463

(51) Int. Cl.
*G06K 9/00* (2022.01)
*G06V 10/75* (2022.01)
(Continued)

(52) U.S. Cl.
CPC ............ *G06V 10/82* (2022.01); *G06V 10/757* (2022.01); *G06V 10/7715* (2022.01)

(58) Field of Classification Search
CPC ......... G01C 21/20; G01C 21/30; G01S 5/163; G05D 1/2435; G05D 1/245; G05D 1/2464;
(Continued)

(56) References Cited

U.S. PATENT DOCUMENTS 9,031,283 B2 5/2015 Arth et al.
9,668,146 B2 5/2017 Lau
(Continued)

FOREIGN PATENT DOCUMENTS

JP 2021536634 A 12/2021
WO 2014/162044 A1 10/2014
(Continued)

OTHER PUBLICATIONS

Office action received for corresponding Japanese Patent Application No. 2024-069433, dated Apr. 24, 2025, 3 pages of office action and 4 pages of translation available.
(Continued)

*Primary Examiner* — Hadi Akhavannik
(74) *Attorney, Agent, or Firm* — Robert P. Michal, Esq.; Rimon PC

(57) ABSTRACT

Encoding a first 3D point cloud of a first coordinate system into a first encoded map comprising first feature center points and first feature vectors;

encoding a second 3D point cloud of a second coordinate system into a second encoded map comprising second feature center points and second feature vectors;

adapting the first input feature vectors based on the first input feature vectors and the second input feature vectors, to obtain a first joint map;

adapting the second input feature vectors based on the first input feature vectors and the second input feature vectors to obtain a second joint map;

checking whether a correlation condition is fulfilled;

extracting the coordinates of the first joint feature center points and the second joint feature center points if the correlation condition is fulfilled;

(Continued)

calculating a transformation between the first coordinate system and the second coordinate system based on the pairs of extracted coordinates.

14 Claims, 7 Drawing Sheets

(51) Int. Cl.
*G06V 10/77* (2022.01)
*G06V 10/82* (2022.01)

(58) Field of Classification Search
CPC ............ G05D 1/2465; G05D 2109/10; G05D 2111/52; G05D 2111/65; G05D 2111/67; G06T 2207/10028; G06T 2207/20081; G06T 2207/20084; G06T 2207/30244; G06T 7/73; G06V 10/757; G06V 10/7715; G06V 10/82
See application file for complete search history.

(56) References Cited

U.S. PATENT DOCUMENTS

| | | | | |
|---|---|---|---|---|
| 9,763,035 | B2 | 9/2017 | Valaee et al. | |
| 9,934,587 | B2 | 4/2018 | Senthamil | |
| 10,834,532 | B2 | 11/2020 | Fuerst et al. | |
| 10,841,556 | B2 * | 11/2020 | Casas | H04N 13/111 |
| 11,393,179 | B2 | 7/2022 | Fleischman et al. | |
| 11,675,068 | B2 * | 6/2023 | Jiang | G06F 18/214 382/219 |
| 2014/0133741 | A1 * | 5/2014 | Wang | G06T 17/05 382/154 |
| 2015/0119086 | A1 | 4/2015 | Mirowski et al. | |
| 2016/0183050 | A1 | 6/2016 | Yiu et al. | |
| 2018/0033160 | A1 | 2/2018 | Ishigami | |
| 2020/0015047 | A1 | 1/2020 | Song et al. | |
| 2020/0058156 | A1 * | 2/2020 | Tran | G06N 3/09 |
| 2020/0082567 | A1 | 3/2020 | Liu | |
| 2020/0357143 | A1 | 11/2020 | Chiu et al. | |
| 2021/0017587 | A1 * | 1/2021 | Cai | C12Q 1/6841 |
| 2021/0063200 | A1 | 3/2021 | Kroepfl et al. | |
| 2021/0112427 | A1 | 4/2021 | Shveki et al. | |
| 2021/0150252 | A1 * | 5/2021 | Sarlin | G06N 3/09 |
| 2021/0373161 | A1 | 12/2021 | Lu et al. | |
| 2022/0155079 | A1 | 5/2022 | Chidlovskii et al. | |
| 2022/0237446 | A1 * | 7/2022 | Lei | G06N 5/022 |
| 2022/0335638 | A1 | 10/2022 | Kar et al. | |

FOREIGN PATENT DOCUMENTS

| | | | |
|---|---|---|---|
| WO | 2015/048434 | A1 | 4/2015 |
| WO | 2020/194079 | A1 | 10/2020 |

OTHER PUBLICATIONS

Kanazaki et al., “Transformating Topological Maps between Heterogeneous Multi-Agents”, IEICE Technical Report, vol. 104, No. 636, Jan. 27, 2005, 10 pages.
Extended European Search Report received for corresponding European Patent Application No. 24171494.8, dated Sep. 25, 2024, 5 pages.
Xue et al., “Research on 3D LiDAR Point Cloud Matching Localization Method”, 5th World Conference on Mechanical Engineering and Intelligent Manufacturing (WCMEIM), Nov. 18-20, 2022, pp. 878-881.
Zhang et al., “Robust LiDAR Localization on an HD Vector Map without a Separate Localization Layer”, IEEE/RSJ International Conference on Intelligent Robots and Systems (IROS), Sep. 27-Oct. 1, 2021, pp. 5536-5543.
“Niantic and 6D.ai: Building The Next Tech Platform”, 6D.ai, Retrieved on Apr. 21, 2024, Webpage available at : https://www.6d.ai/.
Friis, “A Note on a Simple Transmission Formula”, Proceedings of the I.R.E and Waves and Electrons, May 1946, pp. 254-256.
Sinkhorn et al., “Concerning Nonnegative Matrices and Doubly Stochastic Matrices”, Pacific Journal of Mathematics, vol. 21, No. 02, Dec. 1967, 9 pages.
Besl et al., “A Method for registration of 3-D shapes”, IEEE Transactions on Pattern Analysis and Machine Intelligence, vol. 14, No. 02, Feb. 1992, pp. 239-256.
Irschara et al., “From Structure-from-Motion Point Clouds to Fast Location Recognition”, IEEE Conference on Computer Vision and Pattern Recognition, Jun. 20-25, 2009, pp. 2599-2606.
Kendall et al., “PoseNet: A Convolutional Network for Real-Time 6-DOF Camera Relocalization”, Proceedings of the IEEE International Conference on Computer Vision (ICCV), Dec. 7-13, 2015, pp. 2938-2946.
Ioffe et al., “Batch Normalization: Accelerating Deep Network Training by Reducing Internal Covariate Shift”; Proceedings of the 32nd International Conference on Machine Learning, vol. 37, Jul. 7-9, 2015, 9 pages.
Ba et al., “Layer Normalization”, arxiv, Jul. 21, 2016, pp. 1-14.
Krizhevsky et al., “ImageNet Classification with Deep Convolutional Neural Networks”, Advances in Neural Information Processing Systems 25 (NIPS 2012), Dec. 3-6, 2012, pp. 1-9.
Vaswani et al., “Attention is all you need”, Proceedings of the 31st International Conference on Neural Information Processing Systems (NIPS 2017), Dec. 4-9, 2017, pp. 1-11.
Wu et al., “Group Normalization”, Proceedings of the European Conference on Computer Vision (ECCV), Sep. 8-14, 2018, pp. 1-17.
Sarlin et al., “SuperGlue: Learning Feature Matching with Graph Neural Networks”, Proceedings of the IEEE/CVF Conference on Computer Vision and Pattern Recognition (CVPR), Jun. 13-19, 2020, pp. 4938-4947.
Hashemifar et al., “Augmenting visual SLAM with Wi-Fi sensing for indoor applications”, Autonomous Robots, vol. 43, Jul. 18, 2019, pp. 2245-2260.
Thomas et al., “KPConv: Flexible and Deformable Convolution for Point Clouds”, Proceedings of the IEEE/CVF International Conference on Computer Vision (ICCV), Oct. 27-Nov. 2, 2019, pp. 6411-6420.
Sarlin et al., “From Coarse to Fine: Robust Hierarchical Localization at Large Scale”, Proceedings of the IEEE/CVF Conference on Computer Vision and Pattern Recognition (CVPR), Jun. 15-20, 2019, pp. 12716-12725.
Ayyalasomayajula et al., “Deep Learning based Wireless Localization for Indoor Navigation”, Proceedings of the 26th Annual International Conference on Mobile Computing and Networking, Sep. 21-25, 2020, 14 pages.
Oertel et al., “Augmenting Visual Place Recognition With Structural Cues”, IEEE Robotics and Automation Letters, vol. 05, No. 04, Oct. 2020, pp. 5534-5541.
Sun et al., “WiFi Based Fingerprinting Positioning Based on Seq2seq Model”, Sensors, vol. 20, No. 13, Jul. 5, 2020, pp. 1-19.
Brachmann et al., “Visual Camera Re-Localization From RGB and RGB-D Images Using DSAC”, IEEE Transactions on Pattern Analysis and Machine Intelligence, vol. 44, No. 09, Sep. 2022, pp. 5847-5865.
Wang et al., “PointLoc: Deep Pose Regressor for LiDAR Point Cloud Localization”, IEEE Sensors Journal, vol. 22, No. 01, Jan. 1, 2022, pp. 959-968.
Shu et al., “3D Point Cloud-Based Indoor Mobile Robot in 6-DoF Pose Localization Using a Wi-Fi-Aided Localization System”, IEEE Access, vol. 09, 2021, pp. 38636-38648.
Zanjani et al., “Modality-Agnostic Topology Aware Localization”, 35th Conference on Neural Information Processing Systems (NeurIPS 2021), Dec. 6-14, 2021, pp. 1-12.
Yu et al., “Multi-Modal Recurrent Fusion for Indoor Localization”, IEEE International Conference on Acoustics, Speech and Signal Processing (ICASSP), May 23-27, 2022, pp. 5083-5087.
Qin et al., “Geometric Transformer for Fast and Robust Point Cloud Registration”, Proceedings of the IEEE/CVF Conference on Computer Vision and Pattern Recognition (CVPR), Jun. 19-24, 2022, pp. 11143-11152.

(56) References Cited

OTHER PUBLICATIONS

Seidel et al., "914 MHz Path Loss Prediction Models for Indoor Wireless Communications in Multifloored Buildings", IEEE Transactions on Antennas and Propagation, vol. 40, No. 02, Feb. 1992, pp. 207-217.
Sarlin et al., "LaMAR: Benchmarking Localization and Mapping for Augmented Reality", European Conference on Computer Vision (ECCV), Oct. 23-27, 2022, pp. 1-30.
Nabati et al., "Using Synthetic Data to Enhance the Accuracy of Fingerprint-Based Localization: A Deep Learning Approach", IEEE Sensors Letters, vol. 04, No. 04, Apr. 2020, 4 pages.
Song et al., "CNNLoc: Deep-Learning Based Indoor Localization with WIFI Fingerprinting", IEEE SmartWorld, Ubiquitous Intelligence & Computing, Advanced & Trusted Computing, Scalable Computing & Communications, Cloud & Big Data Computing, Internet of People and Smart City Innovation (SmartWorld/SCALCOM/UIC/ATC/CBDCom/IOP/SCI), Aug. 19-23, 2019, pp. 589-595.
Fischer et al., "StickyPillars: Robust and Efficient Feature Matching on Point Clouds Using Graph Neural Networks", Proceedings of the IEEE/CVF Conference on Computer Vision and Pattern Recognition (CVPR), Jun. 19-25, 2021, pp. 313-323.
Office action received for corresponding Finnish Patent Application No. 20235463, dated Jan. 18, 2024, 14 pages.

* cited by examiner

S110 Input 1st 3D point cloud and 1st grid into 1st encoder layer

S120 Encode 1st 3D point cloud into 1st encoded map

S130 Input 1st encoded input map into 1st matching descriptor layer

S140 Input 2nd 3D point cloud and 2nd grid into 2nd encoder layer

S150 Encode 2nd 3D point cloud into 2nd encoded map

S160 Input 2nd encoded input map into 2nd matching descriptor layer

S170 Adapt 1st input feature vectors by 1st input feature vectors and 2nd input feature vectors → 1st joint map S180 Adapt 2nd input feature vectors by 1st input feature vectors and 2nd input feature vectors → 2nd joint map S190 Calculate similarity between 1st and 2nd joint feature vectors S200 Calculate point correlations S210 Correlation condition fulfilled?

yes

S220 Extract coordinates of 1st and 2nd joint feature center point

S230 Calculate transformation (pairs of extracted coordinates)

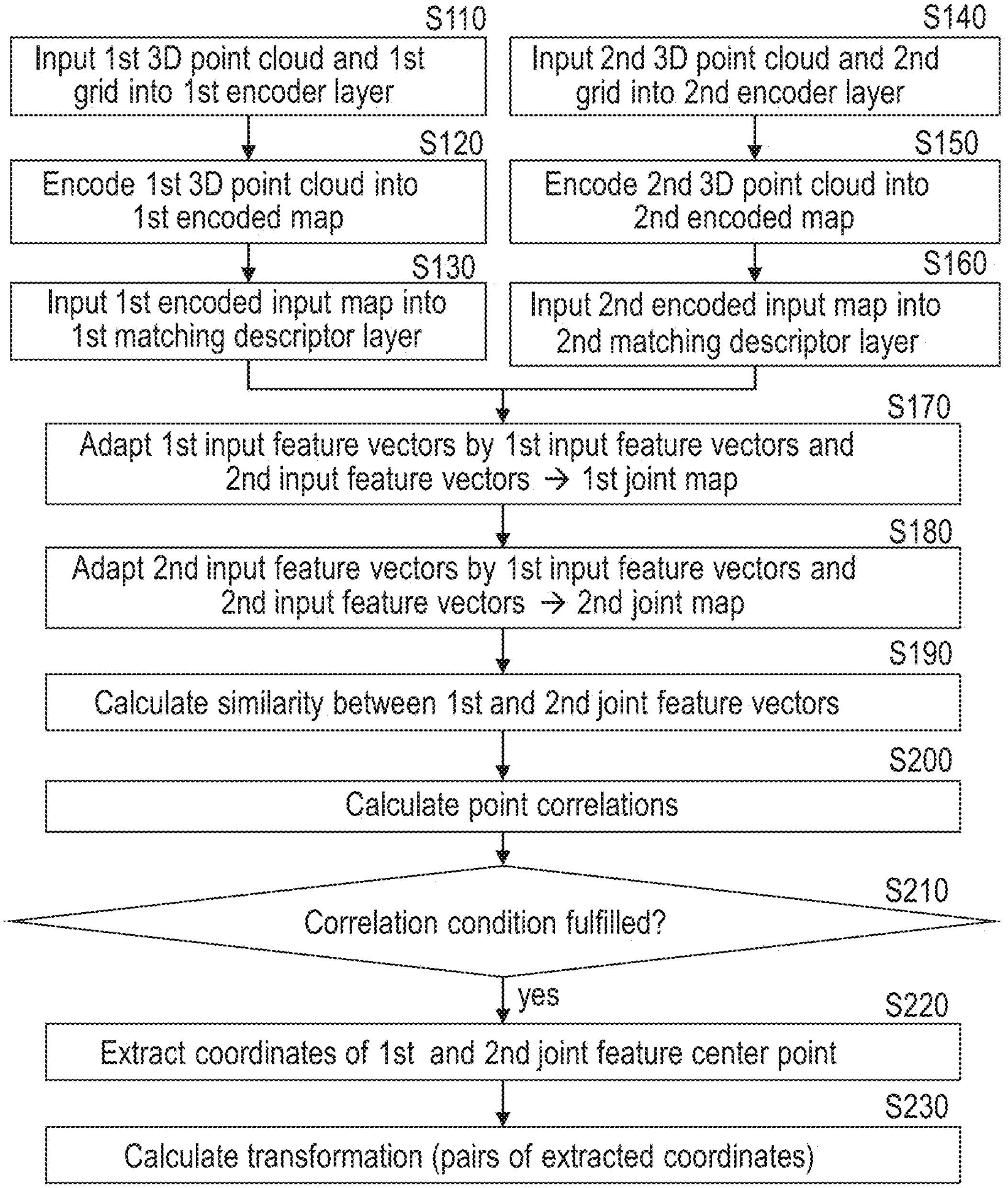

FIG. 7

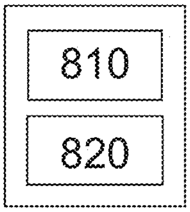

FIG. 8

LOCALIZATION BY A NEURAL NETWORK

RELATED APPLICATION

This application was originally filed in Finland as application No. 20235463, filed on Apr. 26, 2023, which is incorporated herein by reference in its entirety.

TECHNICAL FIELD

The present disclosure relates to localization.

Abbreviations

3D—three-dimensional
AP—Access Point
RF—Radio Frequency
RGB—Red, Green, Blue
RGBD—RGB and depth
SLAM—Simultaneous Localization and Mapping,
RSSI—Received Signal Strength Indicator,
VIO—Visual-Inertial Odometry,
RF—Radio Frequency,
BoW—Bag-of-Words,
SVD—Singular Value Decomposition,
CV—Computer Vision,
DL—Deep learning,
CSI—Channel State Information,
AoA—Angle of Arrival,
ToF—Time of Flight,
BSSID—Basic Service Set Identifier,
GNSS—Global Navigation Satellite System,
DoF—Degrees of Freedom,
IMU—Inertial Measurement Unit,
VPS—Visual Positing System
dB—decibel
dBm—decibel-milliwatts

BACKGROUND

Localization of a sensor (such as a camera or an RF antenna) in an environment is relevant in an industrial metaverse. The most ubiquitous sensors for creating localization maps are cameras. Given a set of camera images, one may want to find the poses of the camera where the images were taken and find the 3D structure of the environment (represented for example as a point cloud). This 3D structure along with metadata can serve as a visual localization map. This localization map connects the digital world with the real world as it enables to find the pose of a query image in the world coordinate frame with 6 degrees of freedom (6DoF, i.e. 3DoF for translation and 3DoF for rotation).

SUMMARY

It is an object to improve the prior art.

According to a first aspect, there is provided an apparatus comprising:

one or more processors, and memory storing instructions that, when executed by the one or more processors, cause the apparatus to perform:

inputting a first 3D point cloud of a first modality and a first grid comprising one or more first cells into a first encoder layer, wherein coordinates of points of the first 3D point cloud are indicated in a first coordinate system;

encoding, by the first encoder layer, the first 3D point cloud of the first modality into a first encoded map of the first modality, wherein the first encoded map of the first modality comprises, for each of the first cells of the first grid, a respective first feature center point and a respective first feature vector, and the coordinates of the first feature center points are indicated in the first coordinate system;

inputting a first encoded input map into a first matching descriptor layer of a first hierarchical layer, wherein the first encoded input map is based on the first encoded map of the first modality and comprises, for each of the first cells, a respective first joint feature center point and a respective first input feature vector, wherein the coordinates of the first joint feature center points are indicated in the first coordinate system;

inputting a second 3D point cloud of the first modality and a second grid comprising one or more second cells into a second encoder layer, wherein the coordinates of points of the second 3D point cloud are indicated in a second coordinate system;

encoding, by the second encoder layer, the second 3D point cloud of the first modality into a second encoded map of the first modality, wherein the second encoded map of the first modality comprises, for each of the second cells of the second grid, a respective second feature center point and a respective second feature vector, and the coordinates of the second feature center points are indicated in the second coordinate system;

inputting a second encoded input map into the first matching descriptor layer, wherein the second encoded input map is based on the second encoded map of the first modality and comprises, for each of the second cells, a respective second joint feature center point and a respective second input feature vector, wherein the coordinates of the second joint feature center points are indicated in the second coordinate system;

adapting, by the first matching descriptor layer, each of the first input feature vectors based on the first input feature vectors, optionally with their first feature center points, and the second input feature vectors, optionally with their second feature center points, to obtain a first joint map, wherein the first joint map comprises, for each of the first joint feature center points, a respective first joint feature vector;

adapting, by the first matching descriptor layer, each of the second input feature vectors based on the first input feature vectors, optionally with their first feature center points, and the second input feature vectors, optionally with their second feature center points, to obtain a second joint map, wherein the second joint map comprises, for each of the second joint feature center points, a respective second joint feature vector;

calculating, by a first optimal matching layer, for each of the first cells and each of the second cells, a similarity between the first joint feature vector of the respective first cell and the second joint feature vector of the respective second cell;

calculating, by the first optimal matching layer, for each of the first cells and each of the second cells, a first point correlation between the respective first cell and the respective second cell based on the similarities between the first joint feature vector of the respective first cell and the second joint feature vectors of the second cells and based on the similarities between the second joint feature vector of the respective second cell and the first joint feature vectors of the first cells;

checking, for each of the first cells and each of the second cells, whether at least one of one or more first correlation conditions for the respective first cell and the respective second cell is fulfilled, wherein the one or more first correlation conditions comprise:

the first point correlation between the respective first cell and the respective second cell is larger than a first correlation threshold of the first hierarchical layer; or the first point correlation between the respective first cell and the respective second cell is among the largest k values of the first point correlations, and k is a fixed value;

extracting, for each of the first cells and each of the second cells, the coordinates of the first joint feature center point of the respective first cell in the first coordinate system and the coordinates of the second joint feature center point of the respective second cell in the second coordinate system to obtain a respective pair of extracted coordinates of the first hierarchical layer in response to checking that the at least one of the one or more first correlation conditions for the respective first cell and the respective second cell is fulfilled;

calculating an estimated transformation between the first coordinate system and the second coordinate system based on the pairs of extracted coordinates of the first hierarchical layer.

The first encoder layer, the second encoder layer, and the first matching descriptor layer of the first hierarchical layer are configured by respective first parameters, and the instructions, when executed by the one or more processors, may further cause the apparatus to perform training of the apparatus to determine the first parameters such that a deviation between the estimated transformation and a known transformation between the first coordinate system and the second coordinate system becomes less than a transformation estimation threshold and such that the first point correlations are increased.

The first modality may comprise one of photographic images, LIDAR images, and ultrasound images.

The first encoder layer may be the same as the second encoder layer.

The instructions, when executed by the one or more processors, may further cause the apparatus to perform at least one of the following:

generating the first 3D point cloud based on a sequence of first images of the first modality, wherein a respective location in the first coordinate system is associated to each of the first images; or generating the second 3D point cloud based on a sequence of second images of the first modality, wherein a respective location in the second coordinate system is associated to each of the second images.

The first encoded input map may be the first encoded map, the first joint feature center points may be the first feature center points, the second encoded input map may be the second encoded map, and the second joint feature center points may be the second feature center points.

The instructions, when executed by the one or more processors, may further cause the apparatus to perform inputting a third 3D point cloud of a second modality and the first grid into a third encoder layer, wherein the coordinates of points of the third 3D point cloud are indicated in the first coordinate system, and the second modality is different from the first modality;

encoding, by the third encoder layer, the third 3D point cloud of the second modality into a third encoded map of the second modality, wherein the third encoded map of the second modality comprises, for each of the first cells of the first grid, a respective third feature center point and a respective third feature vector, and the coordinates of the third feature center points are indicated in the first coordinate system;

inputting the third encoded map into a first neural fusion layer;

inputting the first encoded map into the first neural fusion layer;

generating, by the first neural fusion layer, based on the first encoded map and the third encoded map, the first encoded input map, wherein, for each of the first cells, the respective first joint feature center point is based on the first feature center point of the respective first cell and the third feature center point of the respective first cell, and the respective first input feature vector is based on the first feature vector and optionally the first feature center point of the respective first cell adapted based on the first feature vectors optionally with their first feature center points and the third feature vectors, optionally with their third feature center points, and based on the third feature vector and optionally the third feature center point of the respective first cell adapted by the first feature vectors, optionally with their first feature center points, and the third feature vectors, optionally with their third feature center points;

inputting a fourth 3D point cloud of the second modality and the second grid into a fourth encoder layer, wherein the coordinates of points of the fourth 3D point cloud are indicated in the second coordinate system;

encoding, by the fourth encoder layer, the fourth 3D point cloud of the second modality into a fourth encoded map of the second modality, wherein the fourth encoded map of the second modality comprises, for each of the second cells of the second grid, a respective fourth feature center point and a respective fourth feature vector, and the coordinates of the fourth feature center points are indicated in the second coordinate system;

inputting the fourth encoded map into a second neural fusion layer;

inputting the second encoded map into the second neural fusion layer;

generating, by the second neural fusion layer, based on the second encoded map and the fourth encoded map, the second encoded input map, wherein, for each of the second cells, the respective second joint feature center point is based on the second feature center point of the respective second cell and the fourth feature center point of the respective second cell, and the respective second input feature vector is based on the second feature vector and optionally the second feature center point of the respective second cell adapted by the second feature vectors, optionally with their second feature center points, and the fourth feature vectors, optionally with their fourth feature center points, and based on the fourth feature vector and optionally the fourth feature center point of the respective second cell adapted by the second feature vectors, optionally with their second feature center points, and the fourth feature vectors, optionally with their fourth feature center points.

The second modality may comprise at least one of photographic images, RF fingerprints, LIDAR images, or ultrasound images.

The third encoder layer, the fourth encoder layer, the first neural fusion layer, and the second neural fusion layer are configured by respective second parameters, and the instructions, when executed by the one or more processors, may further cause the apparatus to perform the training of the apparatus to determine the first and second parameters such that the deviation between the estimated transformation and the known transformation between the first coordinate system and the second coordinate system becomes less than the transformation estimation threshold and such that the first point correlations are increased.

The first images may be taken by a first sensor of a first sensor device;

the second images may be taken by a second sensor of a second sensor device; and the instructions, when executed by the one or more processors, may further cause the apparatus to perform conducting a plurality of first measurements of the second modality with a third sensor of the first sensor device;

conducting a plurality of second measurements of the second modality with a fourth sensor of the second sensor device;

generating the third 3D point cloud of the second modality based on the plurality of first measurements, the locations associated to the first images, and a calibration between the first sensor of the first sensor device and the third sensor of the first sensor device;

generating the fourth 3D point cloud of the second modality based on the plurality of second measurements, the locations associated to the second images, and a calibration between the second sensor of the second sensor device and the fourth sensor of the second sensor device.

The third encoder layer may be the same as the fourth encoder layer.

The first neural fusion layer may be the same as the second neural fusion layer.

The instructions, when executed by the one or more processors, may further cause the apparatus to perform inputting the first encoded map of the first modality and a third grid comprising one or more third cells into a fifth encoder layer, wherein each of the third cells comprises respective two or more of the first cells, and the first grid comprises two or more of the first cells;

encoding, by the fifth encoder layer, the first encoded map of the first modality into a fifth encoded map of the first modality, wherein the fifth encoded map of the first modality comprises, for each of the third cells of the third grid, a respective fifth feature center point and a respective fifth feature vector, and the coordinates of the fifth feature center points are indicated in the first coordinate system;

inputting a third encoded input map into a second matching descriptor layer of a second hierarchical layer, wherein the third encoded input map is based on the fifth encoded map of the first modality and comprises, for each of the third cells, a respective third joint feature center point and a respective third input feature vector, wherein the coordinates of the third joint feature center points are indicated in the first coordinate system;

inputting the second encoded map of the first modality and a fourth grid comprising one or more fourth cells into a sixth encoder layer, wherein each of the fourth cells comprises respective two or more of the second cells, and the second grid comprises two or more of the second cells;

encoding, by the sixth encoder layer, the second encoded map of the first modality into a sixth encoded map of the first modality, wherein the sixth encoded map of the first modality comprises, for each of the fourth cells of the fourth grid, a respective sixth feature center point and a respective sixth feature vector, and the coordinates of the sixth feature center points are indicated in the second coordinate system;

inputting a fourth encoded input map into the second matching descriptor layer, wherein the fourth encoded input map is based on the sixth encoded map of the first modality and comprises, for each of the fourth cells, a respective fourth joint feature center point and a respective fourth input feature vector, wherein the coordinates of the fourth joint feature center points are indicated in the second coordinate system;

adapting, by the second matching descriptor layer, each of the third input feature vectors based on the third input feature vectors, optionally with their third joint feature center points, and the fourth input feature vectors, optionally with their fourth joint feature center points, to obtain a third joint map, wherein the third joint map comprises, for each of the third joint feature center points, a respective third joint feature vector;

adapting, by the second matching descriptor layer, each of the fourth input feature vectors based on the third input feature vectors, optionally with their third joint feature center points, and the fourth input feature vectors, optionally with their fourth joint feature center points, to obtain a fourth joint map, wherein the fourth joint map comprises, for each of the fourth joint feature center points, a respective fourth joint feature vector;

calculating, by a second optimal matching layer, for each of the third cells and each of the fourth cells, the similarity between the third joint feature vector of the respective third cell and the fourth joint feature vector of the respective fourth cell;

calculating, by the second optimal matching layer, for each of the third cells and each of the fourth cells, a second point correlation between the respective third cell and the respective fourth cell based on the similarities between the third joint feature vector of the respective third cell and the fourth joint feature vectors of the fourth cells and based on the similarities between the fourth joint feature vector of the respective fourth cell and the third joint feature vectors of the third cells;

checking, for each of the third cells and each of the fourth cells, whether at least one of one or more second correlation conditions for the respective third cell and the respective fourth cell is fulfilled, wherein the one or more second correlation conditions comprise:

the second point correlation between the respective third cell and the respective fourth cell is larger than a second correlation threshold of the second hierarchical layer; or the second point correlation between the respective third cell and the respective fourth cell is among the largest l values of the second point correlations, and l is a fixed value.

The instructions, when executed by the one or more processors, may further cause the apparatus to perform inhibiting the first matching descriptor layer to check, for each of the first cells and each of the second cells, whether the first point correlation between the first joint feature vector of the respective first cell and the second joint feature vector of the respective second cell is larger than the first correlation threshold of the first hierarchical layer in response to checking that the at least one of the one or more second correlation conditions for the respective third cell and the respective fourth cell is fulfilled.

The instructions, when executed by the one or more processors, may further cause the apparatus to perform extracting, for each of the third cells and each of the fourth cells, the coordinates of the third joint feature center point of the respective third cell in the first coordinate system and the coordinates of the fourth joint feature center point of the respective fourth cell in the second coordinate system to obtain a respective pair of extracted coordinates of the second hierarchical layer in response to checking that at least one of the one or more second correlation conditions for the respective third cell and the respective fourth cell is fulfilled;

calculating an estimated transformation between the first coordinate system and the second coordinate system based on the pairs of extracted coordinates of the first hierarchical layer and the pairs of extracted coordinates of the second hierarchical layer.

The instructions, when executed by the one or more processors, may further cause the apparatus to perform the calculating the estimated transformation such that the pairs of extracted coordinates of the first hierarchical layer have a different weight than the pairs of extracted coordinates of the second hierarchical layer in the calculating.

The second matching descriptor layer of the second hierarchical layer is configured by respective third parameters, and the instructions, when executed by the one or more processors, may further cause the apparatus to perform the training of the apparatus to determine the first and third parameters such that the deviation between the estimated transformation and the known transformation between the first coordinate system and the second coordinate system becomes less than the transformation estimation threshold and such that the first point correlations and the second point correlations are increased.

The fifth encoder layer may be the same as the sixth encoder layer.

The fifth encoder layer may be the same as the first encoder layer.

The sixth encoder layer may be the same as the second encoder layer.

The second matching descriptor layer may be the same as the first matching descriptor layer.

The second optimal matching layer may be the same as the first optimal matching layer.

The third encoded input map may be the third encoded map of the first modality, the third joint feature center points may be the third feature center points, the fourth encoded input map may be the fourth encoded map of the first modality, and the fourth joint feature center points may be the fourth feature center points.

The instructions, when executed by the one or more processors, may further cause the apparatus to perform inputting the third encoded map of the second modality and the third grid into a seventh encoder layer;

encoding, by the seventh encoder layer, the third encoded map of the second modality into a seventh encoded map of the second modality, wherein the seventh encoded map of the second modality comprises, for each of the third cells of the third grid, a respective seventh feature center point and a respective seventh feature vector, and the coordinates of the seventh feature center points are indicated in the first coordinate system;

inputting the seventh encoded map into a third neural fusion layer;

inputting the fifth encoded map into the third neural fusion layer;

generating, by the third neural fusion layer, based on the seventh encoded map and the fifth encoded map, the third encoded input map, wherein, for each of the third cells, the respective third joint feature center point is based on the fifth feature center point of the respective third cell and the seventh feature center point of the respective third cell, and the respective third input feature vector is based on the fifth feature vector of the respective third cell adapted by the fifth feature vectors and the seventh feature vectors and based on the seventh feature vector of the respective third cell adapted by the fifth feature vectors and the seventh feature vectors;

inputting the fourth encoded map of the second modality and the fourth grid into an eighth encoder layer;

encoding, by the eighth encoder layer, the fourth encoded map of the second modality into an eighth encoded map of the second modality, wherein the eighth encoded map of the second modality comprises, for each of the fourth cells of the fourth grid, a respective eighth feature center point and a respective eighth feature vector, and the coordinates of the eighth feature center points are indicated in the second coordinate system;

inputting the eighth encoded map into a fourth neural fusion layer;

inputting the sixth encoded map into the fourth neural fusion layer;

generating, by the fourth neural fusion layer, based on the sixth encoded map and the eighth encoded map, the fourth encoded input map, wherein, for each of the fourth cells, the respective fourth joint feature center point is based on the sixth feature center point of the respective fourth cell and the eighth feature center point of the respective fourth cell, and the respective fourth input feature vector is based on the sixth feature vector of the respective fourth cell adapted by the sixth feature vectors and the eighth feature vectors and based on the eighth feature vector of the respective fourth cell adapted by the sixth feature vectors and the eighth feature vectors.

The instructions, when executed by the one or more processors, may further cause the apparatus to perform at least one of:

inputting the first encoded input map into the fifth encoder layer and encoding, by the fifth encoder layer, the first encoded input map and the first encoded map of the first modality into the fifth encoded map of the first modality;

inputting the first encoded input map into the seventh encoder layer and encoding, by the seventh encoder layer, the first encoded input map and the third encoded map of the second modality into the seventh encoded map of the second modality;

inputting the second encoded input map into the sixth encoder layer and encoding, by the sixth encoder layer, the second encoded input map and the second encoded map of the first modality into the sixth encoded map of the first modality;

inputting the second encoded input map into the eighth encoder layer and encoding, by the eighth encoder layer, the second encoded input map and the fourth encoded map of the second modality into the eighth encoded map of the second modality.

The second matching descriptor layer of the second hierarchical layer is configured by respective third parameters, and the instructions, when executed by the one or more processors, may further cause the apparatus to perform the training of the apparatus to determine the first, second, and third parameters such that the deviation between the estimated transformation and the known transformation between the first coordinate system and the second coordinate system becomes less than the transformation estimation threshold and such that the first point correlations and the second point correlations are increased.

The seventh encoder layer may be the same as the eighth encoder layer.

The seventh encoder layer may be the same as the third encoder layer.

The eighth encoder layer may be the same as the fourth encoder layer.

The third neural fusion layer may be the same as the fourth neural fusion layer.

The third neural fusion layer may be the same as the first neural fusion layer.

The fourth neural fusion layer may be the same as the second neural fusion layer.

The instructions, when executed by the one or more processors, may further cause the apparatus to perform at least one of the following:

re-localization of a second sequence of images of the second coordinate system in a first sequence of images of the first coordinate system based on the estimated transformation; or co-localization of a fourth sequence of images of the second coordinate system with a third sequence of images of the first coordinate system based on the estimated transformation; or loop closure of a portion of an image sequence with the entire image sequence based on the estimated transformation, wherein the locations of the images of the portion of the image sequence are indicated in the second coordinate system and the images of the entire image sequence are indicated in the first coordinate system.

According to a second aspect of the invention, there is provided a method comprising:

inputting a first 3D point cloud of a first modality and a first grid comprising one or more first cells into a first encoder layer, wherein coordinates of points of the first 3D point cloud are indicated in a first coordinate system;

encoding, by the first encoder layer, the first 3D point cloud of the first modality into a first encoded map of the first modality, wherein the first encoded map of the first modality comprises, for each of the first cells of the first grid, a respective first feature center point and a respective first feature vector, and the coordinates of the first feature center points are indicated in the first coordinate system;

inputting a first encoded input map into a first matching descriptor layer of a first hierarchical layer, wherein the first encoded input map is based on the first encoded map of the first modality and comprises, for each of the first cells, a respective first joint feature center point and a respective first input feature vector, wherein the coordinates of the first joint feature center points are indicated in the first coordinate system;

inputting a second 3D point cloud of the first modality and a second grid comprising one or more second cells into a second encoder layer, wherein the coordinates of points of the second 3D point cloud are indicated in a second coordinate system;

encoding, by the second encoder layer, the second 3D point cloud of the first modality into a second encoded map of the first modality, wherein the second encoded map of the first modality comprises, for each of the second cells of the second grid, a respective second feature center point and a respective second feature vector, and the coordinates of the second feature center points are indicated in the second coordinate system;

inputting a second encoded input map into the first matching descriptor layer, wherein the second encoded input map is based on the second encoded map of the first modality and comprises, for each of the second cells, a respective second joint feature center point and a respective second input feature vector, wherein the coordinates of the second joint feature center points are indicated in the second coordinate system;

adapting, by the first matching descriptor layer, each of the first input feature vectors based on the first input feature vectors, optionally with their first feature center points, and the second input feature vectors, optionally with their second feature center points, to obtain a first joint map, wherein the first joint map comprises, for each of the first joint feature center points, a respective first joint feature vector;

adapting, by the first matching descriptor layer, each of the second input feature vectors based on the first input feature vectors, optionally with their first feature center points, and the second input feature vectors, optionally with their second feature center points, to obtain a second joint map, wherein the second joint map comprises, for each of the second joint feature center points, a respective second joint feature vector;

calculating, by a first optimal matching layer, for each of the first cells and each of the second cells, a similarity between the first joint feature vector of the respective first cell and the second joint feature vector of the respective second cell;

calculating, by the first optimal matching layer, for each of the first cells and each of the second cells, a first point correlation between the respective first cell and the respective second cell based on the similarities between the first joint feature vector of the respective first cell and the second joint feature vectors of the second cells and based on the similarities between the second joint feature vector of the respective second cell and the first joint feature vectors of the first cells;

checking, for each of the first cells and each of the second cells, whether at least one of one or more first correlation conditions for the respective first cell and the respective second cell is fulfilled, wherein the one or more first correlation conditions comprise:

the first point correlation between the respective first cell and the respective second cell is larger than a first correlation threshold of the first hierarchical layer; or the first point correlation between the respective first cell and the respective second cell is among the largest k values of the first point correlations, and k is a fixed value;

extracting, for each of the first cells and each of the second cells, the coordinates of the first joint feature center point of the respective first cell in the first coordinate system and the coordinates of the second joint feature center point of the respective second cell in the second coordinate system to obtain a respective pair of extracted coordinates of the first hierarchical layer in response to checking that the at least one of the one or more first correlation conditions for the respective first cell and the respective second cell is fulfilled;

calculating an estimated transformation between the first coordinate system and the second coordinate system based on the pairs of extracted coordinates of the first hierarchical layer.

The first encoder layer, the second encoder layer, and the first matching descriptor layer of the first hierarchical layer are configured by respective first parameters, and the method may further comprise training of the apparatus to determine the first parameters such that a deviation between the estimated transformation and a known transformation between the first coordinate system and the second coordinate system becomes less than a transformation estimation threshold and such that the first point correlations are increased.

The first modality may comprise one of photographic images, LIDAR images, and ultrasound images.

The first encoder layer may be the same as the second encoder layer.

The method may further comprise at least one of the following:

generating the first 3D point cloud based on a sequence of first images of the first modality, wherein a respective location in the first coordinate system is associated to each of the first images; or generating the second 3D point cloud based on a sequence of second images of the first modality, wherein a respective location in the second coordinate system is associated to each of the second images.

The first encoded input map may be the first encoded map, the first joint feature center points may be the first feature center points, the second encoded input map may be the second encoded map, and the second joint feature center points may be the second feature center points.

The method may further comprise inputting a third 3D point cloud of a second modality and the first grid into a third encoder layer, wherein the coordinates of points of the third 3D point cloud are indicated in the first coordinate system, and the second modality is different from the first modality;

encoding, by the third encoder layer, the third 3D point cloud of the second modality into a third encoded map of the second modality, wherein the third encoded map of the second modality comprises, for each of the first cells of the first grid, a respective third feature center point and a respective third feature vector, and the coordinates of the third feature center points are indicated in the first coordinate system;

inputting the third encoded map into a first neural fusion layer;

inputting the first encoded map into the first neural fusion layer;

generating, by the first neural fusion layer, based on the first encoded map and the third encoded map, the first encoded input map, wherein, for each of the first cells, the respective first joint feature center point is based on the first feature center point of the respective first cell and the third feature center point of the respective first cell, and the respective first input feature vector is based on the first feature vector and optionally the first feature center point of the respective first cell adapted based on the first feature vectors optionally with their first feature center points and the third feature vectors, optionally with their third feature center points, and based on the third feature vector and optionally the third feature center point of the respective first cell adapted by the first feature vectors, optionally with their first feature center points, and the third feature vectors, optionally with their third feature center points;

inputting a fourth 3D point cloud of the second modality and the second grid into a fourth encoder layer, wherein the coordinates of points of the fourth 3D point cloud are indicated in the second coordinate system;

encoding, by the fourth encoder layer, the fourth 3D point cloud of the second modality into a fourth encoded map of the second modality, wherein the fourth encoded map of the second modality comprises, for each of the second cells of the second grid, a respective fourth feature center point and a respective fourth feature vector, and the coordinates of the fourth feature center points are indicated in the second coordinate system;

inputting the fourth encoded map into a second neural fusion layer;

inputting the second encoded map into the second neural fusion layer;

generating, by the second neural fusion layer, based on the second encoded map and the fourth encoded map, the second encoded input map, wherein, for each of the second cells, the respective second joint feature center point is based on the second feature center point of the respective second cell and the fourth feature center point of the respective second cell, and the respective second input feature vector is based on the second feature vector and optionally the second feature center point of the respective second cell adapted by the second feature vectors, optionally with their second feature center points, and the fourth feature vectors, optionally with their fourth feature center points, and based on the fourth feature vector and optionally the fourth feature center point of the respective second cell adapted by the second feature vectors, optionally with their second feature center points, and the fourth feature vectors, optionally with their fourth feature center points.

The second modality may comprise at least one of photographic images, RF fingerprints, LIDAR images, or ultrasound images.

The third encoder layer, the fourth encoder layer, the first neural fusion layer, and the second neural fusion layer are configured by respective second parameters, and the method may further comprise the training of the apparatus to determine the first and second parameters such that the deviation between the estimated transformation and the known transformation between the first coordinate system and the second coordinate system becomes less than the transformation estimation threshold and such that the first point correlations are increased.

The first images may be taken by a first sensor of a first sensor device;

the second images may be taken by a second sensor of a second sensor device; and the method may further comprise conducting a plurality of first measurements of the second modality with a third sensor of the first sensor device;

conducting a plurality of second measurements of the second modality with a fourth sensor of the second sensor device;

generating the third 3D point cloud of the second modality based on the plurality of first measurements, the locations associated to the first images, and a calibration between the first sensor of the first sensor device and the third sensor of the first sensor device;

generating the fourth 3D point cloud of the second modality based on the plurality of second measurements, the locations associated to the second images, and a calibration between the second sensor of the second sensor device and the fourth sensor of the second sensor device.

The third encoder layer may be the same as the fourth encoder layer.

The first neural fusion layer may be the same as the second neural fusion layer.

The method may further comprise inputting the first encoded map of the first modality and a third grid comprising one or more third cells into a fifth encoder layer, wherein each of the third cells comprises respective two or more of the first cells, and the first grid comprises two or more of the first cells;

encoding, by the fifth encoder layer, the first encoded map of the first modality into a fifth encoded map of the first modality, wherein the fifth encoded map of the first modality comprises, for each of the third cells of the third grid, a respective fifth feature center point and a respective fifth feature vector, and the coordinates of the fifth feature center points are indicated in the first coordinate system;

inputting a third encoded input map into a second matching descriptor layer of a second hierarchical layer, wherein the third encoded input map is based on the fifth encoded map of the first modality and comprises, for each of the third cells, a respective third joint feature center point and a respective third input feature vector, wherein the coordinates of the third joint feature center points are indicated in the first coordinate system;

inputting the second encoded map of the first modality and a fourth grid comprising one or more fourth cells into a sixth encoder layer, wherein each of the fourth cells comprises respective two or more of the second cells, and the second grid comprises two or more of the second cells;

encoding, by the sixth encoder layer, the second encoded map of the first modality into a sixth encoded map of the first modality, wherein the sixth encoded map of the first modality comprises, for each of the fourth cells of the fourth grid, a respective sixth feature center point and a respective sixth feature vector, and the coordinates of the sixth feature center points are indicated in the second coordinate system;

inputting a fourth encoded input map into the second matching descriptor layer, wherein the fourth encoded input map is based on the sixth encoded map of the first modality and comprises, for each of the fourth cells, a respective fourth joint feature center point and a respective fourth input feature vector, wherein the coordinates of the fourth joint feature center points are indicated in the second coordinate system;

adapting, by the second matching descriptor layer, each of the third input feature vectors based on the third input feature vectors, optionally with their third joint feature center points, and the fourth input feature vectors, optionally with their fourth joint feature center points, to obtain a third joint map, wherein the third joint map comprises, for each of the third joint feature center points, a respective third joint feature vector;

adapting, by the second matching descriptor layer, each of the fourth input feature vectors based on the third input feature vectors, optionally with their third joint feature center points, and the fourth input feature vectors, optionally with their fourth joint feature center points, to obtain a fourth joint map, wherein the fourth joint map comprises, for each of the fourth joint feature center points, a respective fourth joint feature vector;

calculating, by a second optimal matching layer, for each of the third cells and each of the fourth cells, the similarity between the third joint feature vector of the respective third cell and the fourth joint feature vector of the respective fourth cell;

calculating, by the second optimal matching layer, for each of the third cells and each of the fourth cells, a second point correlation between the respective third cell and the respective fourth cell based on the similarities between the third joint feature vector of the respective third cell and the fourth joint feature vectors of the fourth cells and based on the similarities between the fourth joint feature vector of the respective fourth cell and the third joint feature vectors of the third cells;

checking, for each of the third cells and each of the fourth cells, whether at least one of one or more second correlation conditions for the respective third cell and the respective fourth cell is fulfilled, wherein the one or more second correlation conditions comprise:

the second point correlation between the respective third cell and the respective fourth cell is larger than a second correlation threshold of the second hierarchical layer; or the second point correlation between the respective third cell and the respective fourth cell is among the largest l values of the second point correlations, and l is a fixed value.

The method may further comprise inhibiting the first matching descriptor layer to check, for each of the first cells and each of the second cells, whether the first point correlation between the first joint feature vector of the respective first cell and the second joint feature vector of the respective second cell is larger than the first correlation threshold of the first hierarchical layer in response to checking that the at least one of the one or more second correlation conditions for the respective third cell and the respective fourth cell is fulfilled.

The method may further comprise extracting, for each of the third cells and each of the fourth cells, the coordinates of the third joint feature center point of the respective third cell in the first coordinate system and the coordinates of the fourth joint feature center point of the respective fourth cell in the second coordinate system to obtain a respective pair of extracted coordinates of the second hierarchical layer in response to checking that at least one of the one or more second correlation conditions for the respective third cell and the respective fourth cell is fulfilled;

calculating an estimated transformation between the first coordinate system and the second coordinate system based on the pairs of extracted coordinates of the first hierarchical layer and the pairs of extracted coordinates of the second hierarchical layer.

The method may further comprise the calculating the estimated transformation such that the pairs of extracted coordinates of the first hierarchical layer have a different weight than the pairs of extracted coordinates of the second hierarchical layer in the calculating.

The second matching descriptor layer of the second hierarchical layer is configured by respective third parameters, and the method may further comprise the training of the apparatus to determine the first and third parameters such that the deviation between the estimated transformation and the known transformation between the first coordinate system and the second coordinate system becomes less than the transformation estimation threshold and such that the first point correlations and the second point correlations are increased.

The fifth encoder layer may be the same as the sixth encoder layer.

The fifth encoder layer may be the same as the first encoder layer.

The sixth encoder layer may be the same as the second encoder layer.

The second matching descriptor layer may be the same as the first matching descriptor layer.

The second optimal matching layer may be the same as the first optimal matching layer.

The third encoded input map may be the third encoded map of the first modality, the third joint feature center points may be the third feature center points, the fourth encoded input map may be the fourth encoded map of the first modality, and the fourth joint feature center points may be the fourth feature center points.

The method may further comprise inputting the third encoded map of the second modality and the third grid into a seventh encoder layer;

encoding, by the seventh encoder layer, the third encoded map of the second modality into a seventh encoded map of the second modality, wherein the seventh encoded map of the second modality comprises, for each of the third cells of the third grid, a respective seventh feature center point and a respective seventh feature vector, and the coordinates of the seventh feature center points are indicated in the first coordinate system;

inputting the seventh encoded map into a third neural fusion layer;

inputting the fifth encoded map into the third neural fusion layer;

generating, by the third neural fusion layer, based on the seventh encoded map and the fifth encoded map, the third encoded input map, wherein, for each of the third cells, the respective third joint feature center point is based on the fifth feature center point of the respective third cell and the seventh feature center point of the respective third cell, and the respective third input feature vector is based on the fifth feature vector of the respective third cell adapted by the fifth feature vectors and the seventh feature vectors and based on the seventh feature vector of the respective third cell adapted by the fifth feature vectors and the seventh feature vectors;

inputting the fourth encoded map of the second modality and the fourth grid into an eighth encoder layer;

encoding, by the eighth encoder layer, the fourth encoded map of the second modality into an eighth encoded map of the second modality, wherein the eighth encoded map of the second modality comprises, for each of the fourth cells of the fourth grid, a respective eighth feature center point and a respective eighth feature vector, and the coordinates of the eighth feature center points are indicated in the second coordinate system;

inputting the eighth encoded map into a fourth neural fusion layer;

inputting the sixth encoded map into the fourth neural fusion layer;

generating, by the fourth neural fusion layer, based on the sixth encoded map and the eighth encoded map, the fourth encoded input map, wherein, for each of the fourth cells, the respective fourth joint feature center point is based on the sixth feature center point of the respective fourth cell and the eighth feature center point of the respective fourth cell, and the respective fourth input feature vector is based on the sixth feature vector of the respective fourth cell adapted by the sixth feature vectors and the eighth feature vectors and based on the eighth feature vector of the respective fourth cell adapted by the sixth feature vectors and the eighth feature vectors.

The method may further comprise inputting the first encoded input map into the fifth encoder layer and encoding, by the fifth encoder layer, the first encoded input map and the first encoded map of the first modality into the fifth encoded map of the first modality;

inputting the first encoded input map into the seventh encoder layer and encoding, by the seventh encoder layer, the first encoded input map and the third encoded map of the second modality into the seventh encoded map of the second modality;

inputting the second encoded input map into the sixth encoder layer and encoding, by the sixth encoder layer, the second encoded input map and the second encoded map of the first modality into the sixth encoded map of the first modality;

inputting the second encoded input map into the eighth encoder layer and encoding, by the eighth encoder layer, the second encoded input map and the fourth encoded map of the second modality into the eighth encoded map of the second modality.

The second matching descriptor layer of the second hierarchical layer is configured by respective third parameters, and the method may further comprise the training of the apparatus to determine the first, second, and third parameters such that the deviation between the estimated transformation and the known transformation between the first coordinate system and the second coordinate system becomes less than the transformation estimation threshold and such that the first point correlations and the second point correlations are increased.

The seventh encoder layer may be the same as the eighth encoder layer.

The seventh encoder layer may be the same as the third encoder layer.

The eighth encoder layer may be the same as the fourth encoder layer.

The third neural fusion layer may be the same as the fourth neural fusion layer.

The third neural fusion layer may be the same as the first neural fusion layer.

The fourth neural fusion layer may be the same as the second neural fusion layer.

The method may further comprise at least one of the following:

- re-localization of a second sequence of images of the second coordinate system in a first sequence of images of the first coordinate system based on the estimated transformation; or
- co-localization of a fourth sequence of images of the second coordinate system with a third sequence of images of the first coordinate system based on the estimated transformation; or
- loop closure of a portion of an image sequence with the entire image sequence based on the estimated transformation, wherein the locations of the images of the portion of the image sequence are indicated in the second coordinate system and the images of the entire image sequence are indicated in the first coordinate system.

The method of the second aspect may be a method of localization.

According to a third aspect of the invention, there is provided a computer program product comprising a set of instructions which, when executed on an apparatus, is configured to cause the apparatus to carry out the method according to the second aspect. The computer program product may be embodied as a computer-readable medium or directly loadable into a computer.

According to some example embodiments, at least one of the following advantages may be achieved:

- Robustness in localization may be improved because the localization is based on point clouds (which may be generated based on sequences of images) instead of based on a single image;
- Robust localization may be performed in real-time;
- Large areas may be covered;
- Ambiguity (e.g. in repetitive areas) may be reduced, in particular by a fusion of different modalities;
- Accuracy of localization may be improved and may be scaled, in particular by a hierarchical approach;
- RF maps may be predicted from an implicit propagation model included in the data, thus a pose of a sensor may be predicted even in an area where measurements were not taken before;
- the process may be camera agnostic and hardly influenced by image distortions;
- The training data collection does not require manual efforts;
- To achieve high accuracy rigid transformation estimation even on the coarsest layer, in the encoding layer the 3D position of the feature vectors is regressed in a data-driven, differentiable, and learnable way.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred example embodiments which is to be taken in conjunction with the appended drawings, wherein:

FIG. 7 shows a method according to an example embodiment; and

FIG. 8 shows an apparatus according to an example embodiment.

DETAILED DESCRIPTION OF CERTAIN EMBODIMENTS

Figure 1:
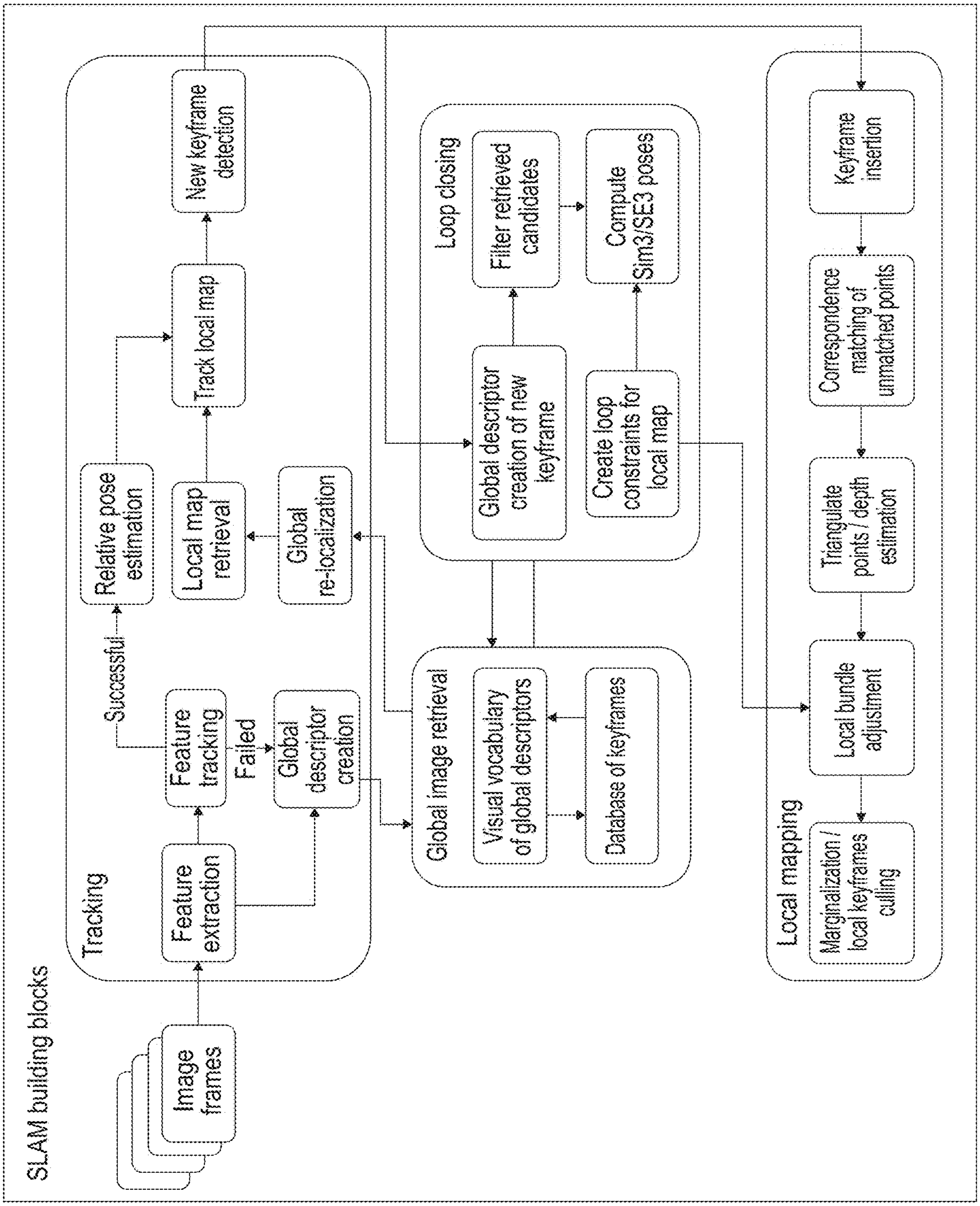
FIG. 1 illustrates SLAM building blocks.

Herein below, certain example embodiments are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some example embodiments aim at providing the transformation between a first map and a second map such that the first map matches the second map. For example, the first map may be a global map e.g. of a building, a floor etc., and the second map may be a local map obtained based on images from a sensor, such as a robot. Each of the first map and the second map may be obtained from respective sequences of images of one or more modalities, such as visual images, LIDAR images, RF measurements, or ultrasound images, etc. At least one of the modalities allows to create a map based on the respective images, such as the modalities of visual images, or LIDAR images.

The second map has its own coordinate system, and typically, the coordinate system of the second map is different from the coordinate system of the first map. A SE(3) transformation is defined between coordinate frames. The transformation between the coordinates of the second map and the coordinates of the first map may comprise a translation (expressed by a translation vector t having 3 independent components) and a rotation (expressed by a rotation matrix R having 3 independent components (a rotation matrix is a 3×3 matrix with 3 degrees-of-freedom)). Thus, in general, the pose has 6 independent components (6 DoFs corresponding to position and orientation, also called "6D pose"). In some example embodiments, the pose may have less than 6 DoFs, if respective restrictions are imposed.

In detail, one, two, or three of the following activities may be performed by some example embodiments:

- re-localization: match the local map (second map) with the global map (first map);
- co-localization: match a second local map (second map) with a first local map (first map); and
- loop closure: align a partial local map (second map) obtained from a subset of the images on which the local map is obtained with the (entire) local map (first map). This procedure is useful for correcting a drift of the local map which may arise from accumulating small odometry errors.

Hereinafter, some example embodiments are explained for re-localization, where the first map is the global map, and the second map is the local map. The transformation indicates the position and orientation (the pose) of the sensor used to obtain the images on which the local map is based in the coordinate system of the global map. The described procedures may be applied correspondingly to co-localization and loop closure.

The 3D structure of an environment may be represented by a point cloud. Here, as an example, generation of a point cloud from camera images is explained. Each camera image is associated with a location of the camera at the time of image taking. Typically, by visual-inertial odometry, the relative transformation between adjacent camera frames may be obtained, serving as good initial values for the SLAM state estimation. The output of the SLAM algorithm will further refine the initial relative transformation of the frames and will provide depth estimates for a subset of the image pixels. Based on the estimated depth information and the relative transformation a 3D point cloud is built representing the structure of the environment. When the tracking is lost between frames and/or because of drift error correction, re-localization may be used.

In the process of creating localization maps and localization algorithms, robustness can be achieved by multi-modal sensor fusion, as used by the visual-inertial odometry. Therein, inertial measurement units (IMUs) can significantly improve robustness because they are not exposed to significant light variations, flares, dynamic environments such as cameras, and they can measure the angular rate and the acceleration of the agents. In a tightly coupled sensor fusion system, information coming from camera images can facilitate the estimation of the gravity vector, the gyroscope and accelerometer biases, resulting in significant drift reduction. In some example embodiments, the location of the camera at the time of imaging may be obtained by visual odometry or inertial odometry only instead of by visual-inertial odometry.

A mathematical framework for creating a 3D reconstruction of the environment while determining the 6 DoF track of the camera is a Simultaneous Localization and Mapping (SLAM) algorithm or a Structure for Motion (SFM) algorithm. There are several versions of such algorithms.

Typically, SLAM algorithms comprise two stages: in the first stage (global mapping stage), the SLAM algorithms provide maps that are suitable for localization purposes. Depending on the number of images used to obtain the map, this stage might be slow or fast. In the next stage, one may use localization to identify the pose of a new image or image sequence in the obtained map.

In the global mapping stage, a complex optimization problem called full bundle adjustment is performed to reduce any pose errors and 3D reconstruction errors. An element of the map optimization is loop closure detection. By detecting loops in the mapping process, the accumulated drift and the 3D reconstruction errors can be significantly reduced. This non-convex optimization involves a high number of state variables, making this phase very compute intensive, and therefore is typically done offline. Local mapping and localization is often performed online, but may be performed offline, too.

Generation of a Point Cloud from a Sequence of Images

With reference to FIG. 1, a SLAM algorithm (SLAM pipeline) is explained as an example how to generate a point cloud based on a sequence of images.

The main building blocks of the example SLAM pipeline are: tracking, loop closing, local mapping, and global image retrieval.

In the tracking phase, the goal is to determine the relative odometry between two consecutive frames and to decide if the new image frame is a keyframe or not. There is no exact definition for a keyframe, since different implementations define different heuristics for keyframe detection. In general, a keyframe contains new information about the environment that is not available in previous keyframes. To compute the odometry between two consecutive frames, features points (and corresponding feature vectors) are extracted and tracked. If the feature tracking is successful, the relative pose of the two images can be computed and depending on the sensor setup, the depth information of the feature point might be estimated.

If the feature tracking fails, the global re-localization procedure starts. It aims at finding the current pose in the map that exists so far. This task is particularly challenging because the complexity (the search space) of the problem increases as new keyframes are inserted into the keyframe database. To attempt global image retrieval from the database of keyframes, a global descriptor of the query image is created. In many traditional solutions, Bag of Words (BoW) algorithms quantize the feature descriptors of the images and create a frequency histogram of the quantized feature vectors. As another option, deep learning models can be trained to produce state-of-the-art global image descriptors that can be searched very efficiently. After creating the global descriptor, a similarity metric is computed between the query image's global descriptor and all the stored keyframes' global descriptors. Images with the highest similarity scores are retrieved as candidates of the image matching process, followed by different filtering algorithms that further refine the candidate set. If the retrieval process succeeds, the global pose of the query image is computed, and a local map of the environment is retrieved based on the co-visibility graph. The local map contains keyframes, 3D feature points with local feature descriptors and depth information. The feature points of the 3D map are searched for on the 2D query image, and from these 3D-2D matches, the camera pose can then be recovered in a Perspective-n-Point (PnP) scheme. The tracking is continued by analyzing a new image.

If a new keyframe is detected, the loop closing procedure may be initiated. Here the goal is to find similar keyframes from the past, to find out whether the camera visited the same place already. The retrieval procedure is similar to the one presented before; the outputs of this block are the loop constraints that are added to the bundle adjustment optimization. The optimization can make use of the fact that along a loop in the pose graph the overall pose change should be identity.

The local mapping module is responsible for refining the local map by minimizing the inconsistencies between the 3D structure and the camera poses in the bundle adjustment procedure. The inconsistencies are formulated as different residual functions. This non-convex optimization is formulated as a least-squares minimization problem. During optimization, a significant number of state variables: poses, depth values (of points), sensor extrinsic and intrinsic parameters are updated. Reprojection error functions connect pose, depth, and calibration state variables with optical flow measurements. If available, IMU-based residual functions may connect adjacent pose and IMU intrinsic state variables with the pre-integrated IMU measurements. Finally, depending on the purpose of the created map, the number of the state variables can be reduced, and as a result the local map will represent only a limited region of the environment. On the contrary, if every keyframe is kept, the local map will represent a larger region of the environment.

In the global map optimization component (which can run in the background or in an offline phase), the goal is to estimate very accurately: (i.) 3D reconstruction of the environment, (ii.) the camera poses from where the images were captured, and (iii.) descriptors attached to the 3D points that help solve the localization problem. Marginalization or keyframe culling may be performed to keep the computational complexity limited to the given processing hardware.

Thus, from a sequence of images, a point cloud is generated. Each point of the point cloud is defined by its coordinates in the respective coordinate system and a feature vector. The feature vector is indicative of a property of the point, such as RGB, reflectivity, etc.

Usage of point clouds as input for the re-localization (or co-localization or loop closure) has an advantage over usage of single images: Existing solutions attempt to find the pose of a single query image. However, there are environments where the lack of descriptive features or repetitive patterns result in high ambiguity. This ambiguity may be solved (at least partly) by the usage of point clouds which are based on a sequence of captured images and/or the fusion of different modalities.

It is known that the image-based localization problem is hard to solve because the lightning conditions encountered during a day period or the seasonal changes in the environment introduce different artifacts. Creating visual descriptors and models that can generalize for every situation is particularly challenging. By creating local maps for structure representation and registering the RF measurements together with camera poses a better representation can be built for localization purposes. After a global map is built, different deep learning models can be trained to register the features of local maps created in different conditions. Nevertheless, it is also possible to train one model that generalizes to every condition by creating a set of local maps of the same region at different times of the day and/or season.

Localization, image retrieval algorithms, and data-driven trained models may be influenced heavily by camera lens distortion. Only suboptimal accuracy is achieved when the query images are created with different cameras than the keyframe images. Some example embodiments are camera agnostic since the camera image sequences are transformed to point clouds.

As another option, the 3D point cloud may be predefined, e.g. based on planning data describing how an environment (such as a building) was planned. However, if the 3D point cloud is based on planning data, there is a risk that the reality of the environment captured by a sensor (such as a camera) does not fit to the planning data.

Basic System According to Some Example Embodiments

Figure 2:
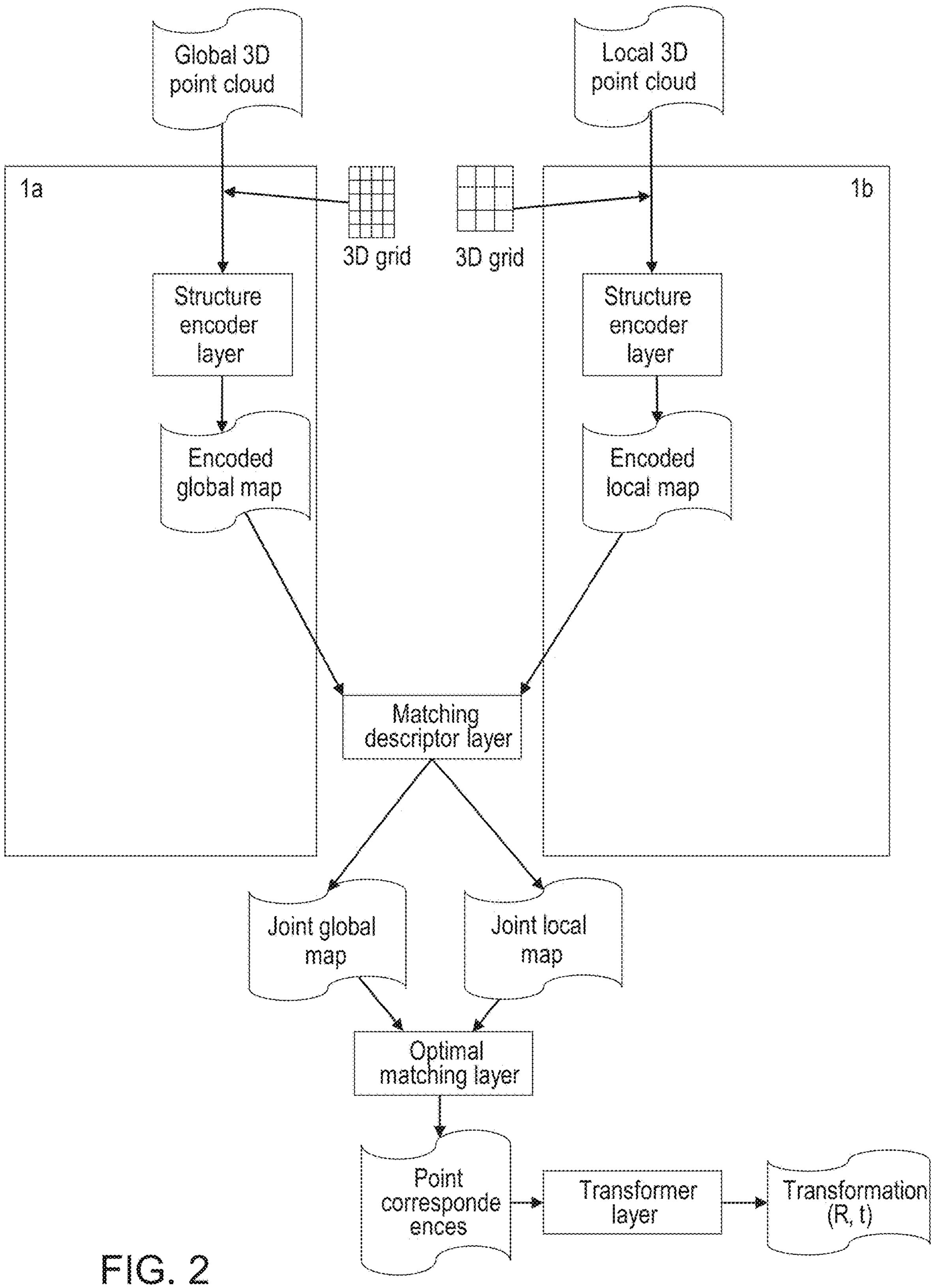
FIG. 2 shows a functional structure of an example embodiment.

With reference to FIG. 2, in this section, a basic system according to some example embodiments is described. The basic system comprises two pipelines 1*a*, 1*b*, wherein pipeline 1*a* is for the global map represented by a global 3D point cloud, and pipeline 1*b* is for the local map represented by a local 3D point cloud. The pipelines 1*a*, 1*b* and their parameters may be the same for both point clouds or different for the two point clouds. The pipelines 1*a*, 1*b* operate independently from each other. The parameters of the layer(s) included in the pipelines are learned in the training process described further below. The same applies for the pipelines described for other embodiments further below.

For inference (query phase), the 3D point clouds (coordinates and respective feature vectors) are input into the respective pipeline. In addition, a respective 3D grid defining cells (voxels) is input into each of the pipelines. The 3D grid may be the same for the pipeline 1*a* and the pipeline 1*b* or different for the pipelines. The 3D grid for the local map may be shifted and/or rotated relative to the 3D grid for the global map. Furthermore, the number of (relevant) cells may be the same or different for the global map and the local map because these maps may cover volumes of different sizes. Typically, the cells of the grid are cubes, but they may have any shape (e.g. general parallelepipeds or pyramids) by which the whole volume may be covered. The size of the cells of the 3D grid may be selected dependent on the required resolution and the available processing power. The number of cells of the 3D grid may be one, but typically it is two or more. The cells of the 3D grid may extend infinitely far into one direction (e.g. the height direction), such that the calls may be expressed by two coordinates only. I.e., the 3D grid may be equivalent to a 2D grid.

Hereinafter, the function of one of the pipelines 1*a*, 1*b* (jointly referred as 1) is representatively described.

The pipeline 1 comprises a structure encoder layer ("first and second encoder layers"). The structure encoder layer encodes the 3D point cloud in a transformation invariant way. This task is challenging because the points of the 3D point cloud are not arranged regularly. Some cells of the 3D grid may not comprise any point, while other cells may comprise one or more points with respective feature vectors. Several suitable encoding techniques exist like: (i.) projection networks, where points are projected to regular 2D and 3D grid structures followed by regular 2D or 3D convolutional operators, (ii.) graph convolution networks, (iii.) point-wise multi-layer perceptron networks or (iv.) point convolutional networks.

The 3D grid may be used for data compression. By applying data compression, the number of points is reduced and becomes structurally better organized. When data compression is performed, the goal is to define: (i.) structural descriptors encoded as feature vectors for every grid cell and (ii.) regress the feature (center) point coordinates for the structural and RF descriptors that will be used in computing the rigid transform.

The point compression operation for one 3D grid configuration may be formulated as follows:

(i.) define a 3D grid with a given grid cell size, (ii.) group the input points based on the grid cells, (iii.) regress the position of the output feature center point and any extra parameters of the chosen convolution type, (iv.) define support points for every feature center point (the set of the support points is the collection of the neighbouring points of the feature center points, typically defined by the radius of the convolutions or based on the neighbourhood selection algorithms, furthermore the radius of the convolution might be equal to, larger than, or smaller than the size of the grid cell); based on the feature vectors of the support points, a feature vector is created for the output feature point (i.e. the feature center point). The feature vectors are calculated by performing several groups of convolution, normalization and activation operations.

Thus, the structure encoder layer obtains for each cell a feature center point, i.e. coordinates of a point representing the cell with a feature vector representing the feature(s) of the cell.

Note that, due to the encoding, the features in the encoded global map may not have any ordinary meaning such as RGB or reflectivity. They have to be considered as abstract features. The same applies to the output from the other encoding layers described later.

The first and second encoder layers of the pipelines 1*a* and 1*b* may have the same or a different architecture (e.g. number of convolutional layers etc.) and/or the same or different parameters. In some example embodiments, the first and second encoder layers may be the same.

The outputs of the structure encoder layer (i.e., the respective encoded map) of both pipelines is input into the matching descriptor layer. In other words, in this example embodiment, the outputs of the structure encoder layers may be considered as encoded input maps to the matching descriptor layer. The matching descriptor layer (and the other layers following the matching descriptor layer) are common for the global map and the local map and do not belong to one of the pipelines 1*a* and 1*b* specific for the global map or the local map.

In the matching descriptor layer, a function with learnable parameters is applied to the feature vector of each of the feature center points of the respective encoded map. The function describes how the feature vectors and the position of the other feature center points of the respective encoded map influence the feature vector of the selected feature center point of the same map. The function may depend on the distance between the respective feature center points. An example of such a mechanism is self-attention. In addition, a further function is applied describing how the feature vector of each feature center point of one of the encoded maps is influenced by the feature vectors and the position of the feature center points of the other one of the encoded maps. The further function may depend on the distance between the respective feature center points. An example of such a mechanism is cross-attention. The parameters of these functions are learned by the training process described further below.

As a result of the matching descriptor layer, a joint global map and a joint local map ("joint maps") are obtained. The joint maps comprise an encoded feature vector for each feature center point of the two encoded maps.

The joint maps are input into the optimal matching layer. In the optimal matching layer, a similarity between the feature vectors of the feature center points of the joint global map and the feature vectors of the feature center points of the joint local map is calculated. Based on the similarity values as a second step a soft-assignment matrix is computed that contains matching probabilities for each pair of features. The soft assignment is found by solving an optimal transport problem that is formulated as sum maximization problem. We refer to the values of this soft-assignment matrix as point correspondences.

The soft-assignment matrix has as many columns (or rows) as the number of cells in the encoded global map and as many rows (or columns, respectively) as the number of cells in the encoded local map and one more dustbin row and one more dustbin column to indicate that a first feature vector does not correspond to any second feature vector. In the dustbin row and dustbin column, an initial value is a parameter that is learnt during training. A Sinkhorn algorithm may be applied on this initial similarity matrix to obtain the soft-assignment matrix. The top k values (k being a predefined constant value) and/or the values being larger than a threshold (correlation threshold) may be selected out of the soft-assignment matrix to identify the cells where the feature vectors correspond to each other. The output of the optimal matching layer is a set of corresponding point pairs.

The transformer layer extracts the coordinates of the feature center points of the cells of the encoded global map and the coordinates of the feature center points of the corresponding cells of the encoded local map (i.e., for the cells which are assumed to correspond to each other according to the soft-assignment matrix) and calculates the transformation (i.e. position t and orientation R) between these feature center points. If there are plural correspondences, they are jointly taken into account by an algorithm, such as a least-square algorithm. By the transformation, each pose in the local coordinate system may be transformed in a corresponding pose in the global coordinate system (and vice versa).

Fusion of Modalities According to Some Example Embodiments

Figure 3:
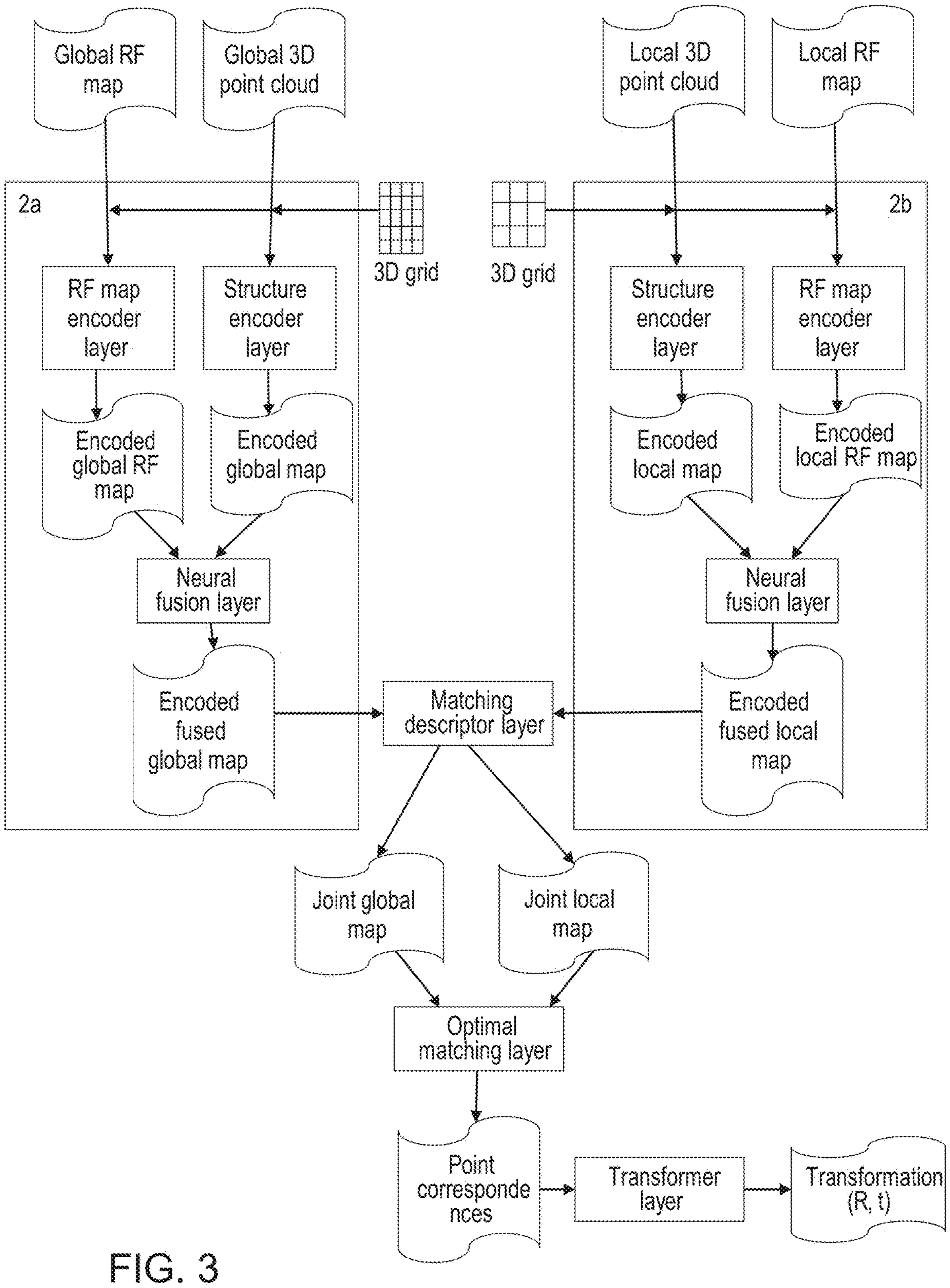
FIG. 3 shows a functional structure of an example embodiment.

With reference to FIG. 3, an example embodiment is described where the maps obtained by different modalities are fused. Modalities are, for example, images in the visible region (photographic images), RF fingerprints, LIDAR images. In the example embodiment of FIG. 3, maps obtained from photographic images and from RF measurements are fused.

In the example embodiments, RF fingerprints are registered to the 6 DoF camera poses at the time of image taking for generating the respective global or local map (point cloud). Namely, since the calibration between the camera and the RF antenna for receiving the RF signals (i.e., the distance and relative orientation) are known for the respective sensor (device), the pose of the RF fingerprints may be indicated in the coordinate system of the camera. If an RF measurement is taken at a time at which a photographic image was not captured and if the sensor may have moved since the last image capturing, the pose of the RF measurement may be obtained by interpolation between the poses at image capturing before and after the RF measurement (or by extrapolation from the poses at image capturing before (or after) the RF measurement).

From these joint measurements, joint feature vectors are generated by fusing the spatial information coming from the point clouds and the RF fingerprints. If the registration fails because of non-overlapping maps, or if there is not enough information to remove the matching ambiguity, then the local map can be extended by acquiring more images until the matching is successful. RF fingerprints may comprise e.g. BSSIDs and/or RSSI values of one or more RF transmitters, such as WiFi APs.

In the data collection phase, image-based localization (in the respective coordinate system) determines the pose of RF fingerprint measurements. Thus, respective RF maps comprising RF fingerprints with certain poses are obtained. The RF maps may be considered as 3D point clouds of the modality RF measurements. The 3D coordinates are the places where the measurements were taken and the feature vector is composed by the measured RF fingerprint and the orientation of the measurement device. The RF maps may be encoded in a similar way as the structural maps.

As shown in FIG. 3, there is pipeline 2*a* for the global map and pipeline 2*b* for the local map. These pipelines comprise the first and second (structure) encoder layers, as described with respect to the example embodiment of FIG. 2. In addition, each of the pipelines comprises a respective RF map encoder layer ("third and fourth encoder layers") and a respective neural fusion layer. The RF map encoder layer and/or the neural fusion layer and their parameters may be the same or different for the two pipelines. Different from FIG. 2, the encoded global map output from the structure encoded layer is not input into the matching descriptor layer but into the neural fusion layer of the respective pipeline. The pipelines 2*a*, 2*b* operate independently from each other.

The RF map encoder layer corresponds functionally to the structure encoder layer, but instead of the features of the points of the point cloud encoded in the structure encoder layer, the RF map encoder layer encodes the RF fingerprints with their poses. The same 3D grid as for the structure encoder layer is used. The resulting encoded RF map comprises a feature center point for each cell with a respective encoded RF fingerprint. Here, the feature center points of the encoded global/local RF map may be the same or different from the feature center points of the encoded global/local map. The parameters of the RF map encoder layer are learned by the training process described further below.

Both the encoded global/local RF map and the encoded global/local structure map of each of the pipelines 2*a*, 2*b* are input into the respective neural fusion layer. In the neural fusion layer, similarly to the matching descriptor layer described with respect to the example embodiment of FIG. 2, a function is applied to each of the feature vectors of every feature center point of the respective encoded map. The function describes how the other points of the respective encoded map influence the selected point of the map of the same modality. That is, in the structural feature vectors are updated based on the structural feature vectors, and the RF feature vectors are updated based on the RF feature vectors. The function may depend on the distance between the respective feature center points. An example of such a mechanism is self-attention. In addition, a further function (may be the same as or different from the further function used in the matching descriptor layer) is applied describing how each point of the encoded map of one modality is influenced by the points of the encoded map of the other modality and vice versa. That is, the RF feature vectors are updated based on the structural feature vectors and vice versa. The further function may depend on the distance between the respective feature center points. An example of such a mechanism is cross-attention. The parameters of these functions are learned by the training process described further below.

Still furthermore, the neural fusion layer calculates a new feature center point ("joint feature center point") for each cell. For example, the new feature center point of a cell may be calculated as an arithmetic mean of the feature center points of the cell in the two encoded maps input into the neural fusion layer. As another option, one of the feature center points of one of the modality may be selected as the new feature center point.

The result of the processing by the neural fusion layer of each of the pipelines is a respective encoded fused global map. It comprises for each cell of the 3D grid a feature center point and an encoded feature vector (provided that the cell comprises at least one point). Thus, the encoded fused global/local map of FIG. 3 corresponds to the encoded global/local map of FIG. 2, but comprises less ambiguity due to the fusion of different modalities. The encoded fused global map and the encoded fused local map are input into the matching descriptor layer. In other words, in this example embodiment, the outputs of the neural fusion layers may be considered as encoded input maps to the matching descriptor layer. The processing of the further layers is the same as described with respect to FIG. 2.

In some example embodiments, not only two modalities but three or more modalities may be fused.

Hierarchical Model According to Some Example Embodiments

Figure 4:
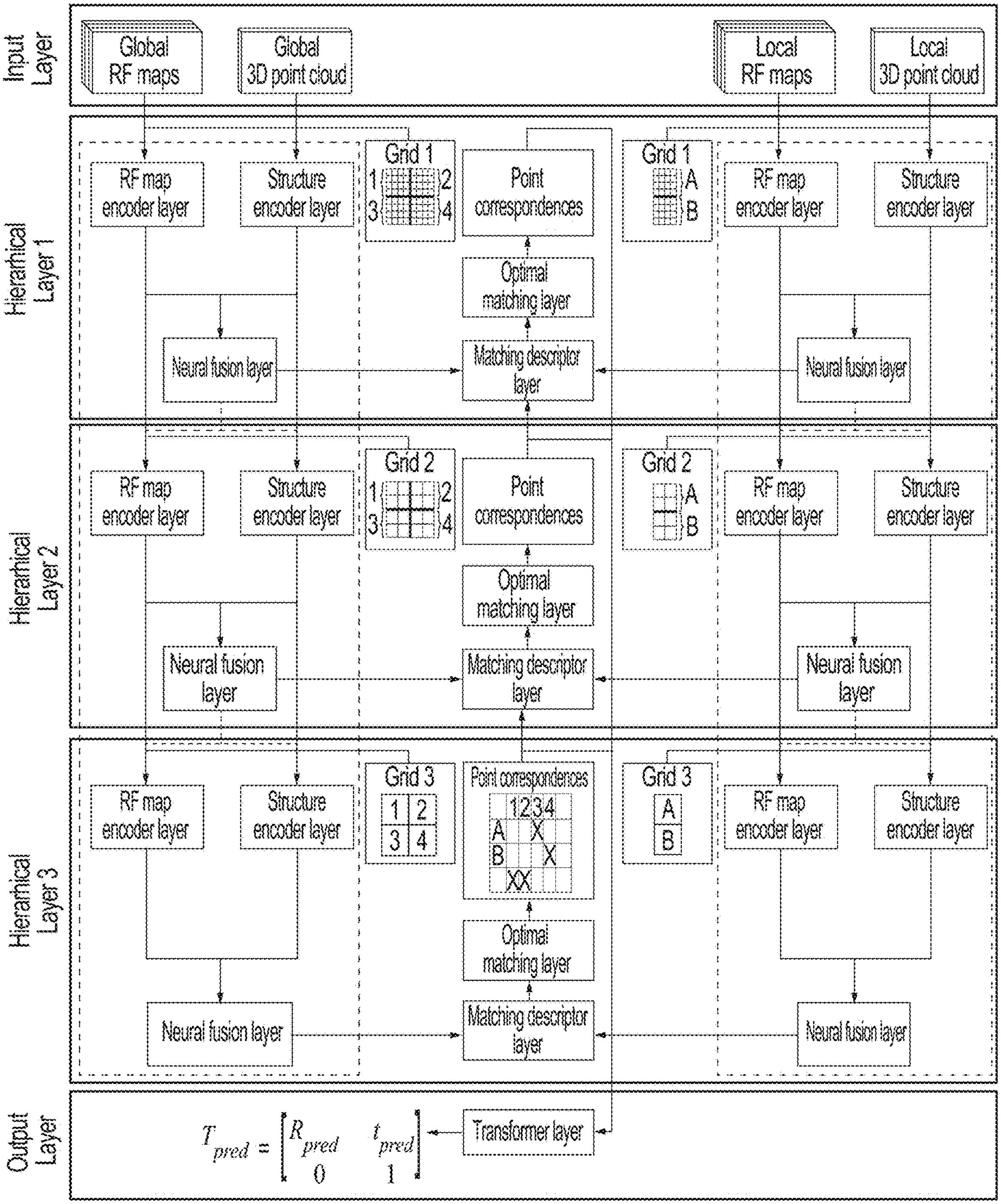
FIG. 4 shows a functional structure of an example embodiment.

FIG. 4 shows an example embodiment comprising fusion of modalities (as described with respect to FIG. 3) and a hierarchical setup with 3D grids of increasing cell sizes. While FIG. 4 includes fusion of different modalities (photographic images and RF measurements), in some example embodiments point clouds of only one modality may be used (as in the example embodiment of FIG. 2). FIG. 4 shows an example with three hierarchical layers, but the number of hierarchical layers may be 2 or 4 or more.

In each of the hierarchical layers, the processing is the same as described with respect to FIG. 3. For simplicity, the respective maps shown in FIG. 3 are not shown in FIG. 4. The 3D grids become coarser from hierarchical layer 1 to hierarchical layer 3, i.e. the cells of 3D grid 1 (i.e. of the hierarchical layer 1) are smaller than the cells of 3D grid 2 (i.e. of the hierarchical layer 2), and these are smaller than the cells of 3D grid 3 (i.e. of the hierarchical layer 3). In the example embodiment of FIG. 4, for the global map, there are 4 cells (cell 1, cell 2, cell 3, cell 4) in the grid 3 of the hierarchical layer 3, but 16 cells in the grid 2 of the hierarchical layer 2, wherein respective 4 cells of the grid 2 correspond to one of the cells of the grid 3. Correspondingly, there are 64 cells in the grid 1 of the hierarchical layer 1, wherein respective 4 cells of the grid 1 correspond to one of the cells of the grid 2. For the local map, each of the two cells A, B of the grid 3 of the hierarchical layer 3 corresponds to respective 4 cells of the grid 2 of the hierarchical layer 2, and each of the 8 cells of the grid 2 of the hierarchical layer 2 corresponds to respective 4 cells of the grid 1 of the hierarchical layer 1. In other example embodiments, the correspondence ratio between the number of corresponding cells of different hierarchical layers (1:4 in FIG. 4) may be different from this value, such as 1:2, 1:3, 1:5, 1:8, or 1:16, but is not limited to these values.

The pipelines for the global map and the pipelines for the local map may perform the respective processing independently from the pipelines for the other map. For each of the maps, the processing of the pipelines (RF map encoder layer, structure encoder layer, neural fusion layer) are performed in a sequence from the lowest hierarchical layer (finest 3D grid) to the highest hierarchical layer (coarsest 3D grid). That is, the input to the RF map encoder layer of hierarchical layer 2 is the output (encoded global/local RF map) of the hierarchical layer 1, and the input to the structure encoder layer of layer 2 is the output (encoded global/local map) of the hierarchical layer 1, and so on for higher hierarchical layers. In addition, in some example embodiments, in one or both of the pipelines, the output of the neural fusion layer of the lower hierarchical layer may be additionally input into the RF map encoder layer and the structure encoder layer of the higher hierarchical layer. In FIG. 4, this option is indicated by dashed lines.

In some example embodiments, the information on point correspondences of the higher hierarchical layer is input into the matching descriptor layer of the lower hierarchical layer. Based on this information, the matching descriptor layer of the lower hierarchical layer may exclude those cells from the calculations of the mutual influences (such as the self-attention mechanism and/or the cross-attention mechanism). Thus, calculation effort may be saved, but the computed matching descriptors might miss important information that was present in the feature vectors of the filtered points.

As another option, every feature point may be used for computing the matching descriptors, but the output feature points are filtered out based on the point correspondences of the coarser level. In this case, the matching descriptors might have a higher quality and still some computational gain comes from the optimal matching layer, because the soft-assignment matrix is computed between less matching descriptors.

For example, the 3D grid 3 of the hierarchical layer 3 comprises 4 coarse cells. The hierarchical layer 3 identifies that two coarse cells of the global map are similar to two coarse cells of the local map, and the other coarse cells of the global map are not similar to any of the coarse cells of the local map and vice versa. Each of the coarse cells of the 3D grid 3 corresponds to 4 finer cells of the 3D grid 2 of the hierarchical layer 2, wherein the 3D grid 2 has 16 finer cells in total. Due to the knowledge from the hierarchical layer 3, the hierarchical layer 2 has to look for similarities of 8 finer cells of the global map with 8 finer cells of the local map (64 calculations). Without the input from the hierarchical layer 3, the hierarchical layer 2 has to look for similarities between 16 finer cells of the global map and 16 finer cells of the local map, resulting in 256 calculations.

Correspondingly, the point correspondences obtained in the hierarchical layer 2 is input into the matching descriptor layer of the hierarchical layer 1 with still finer cells. Thus, calculation effort may be saved in the hierarchical layer 1, too.

In some example embodiments, the soft-assignment matrix of a single hierarchical layer (typically the lowest hierarchical layer (hierarchical layer 1)) is used by the transformer layer to extract respective coordinate pairs and to estimate the transformation based on the extracted coordinate pairs. In other example embodiments, soft-assignment matrices of plural hierarchical layers (typically including the lowest hierarchical layer (hierarchical layer 1)) are used by the transformer layer to extract respective coordinate pairs and to estimate the transformation based on the extracted coordinate pairs. The respective coordinate pairs may have different weights in the estimation of the transformation. The weights may depend, for example, on the coarseness of the grid (the coarser the grid, the lower the weight) and/or the respective value of the soft-assignment matrix (the higher the value, the higher the weight).

In some example embodiments, one or more of the hierarchical layers may not comprise a matching descriptor layer and an optimal matching layer. In such example embodiments, only the processing in the pipelines is performed.

Figure 5:
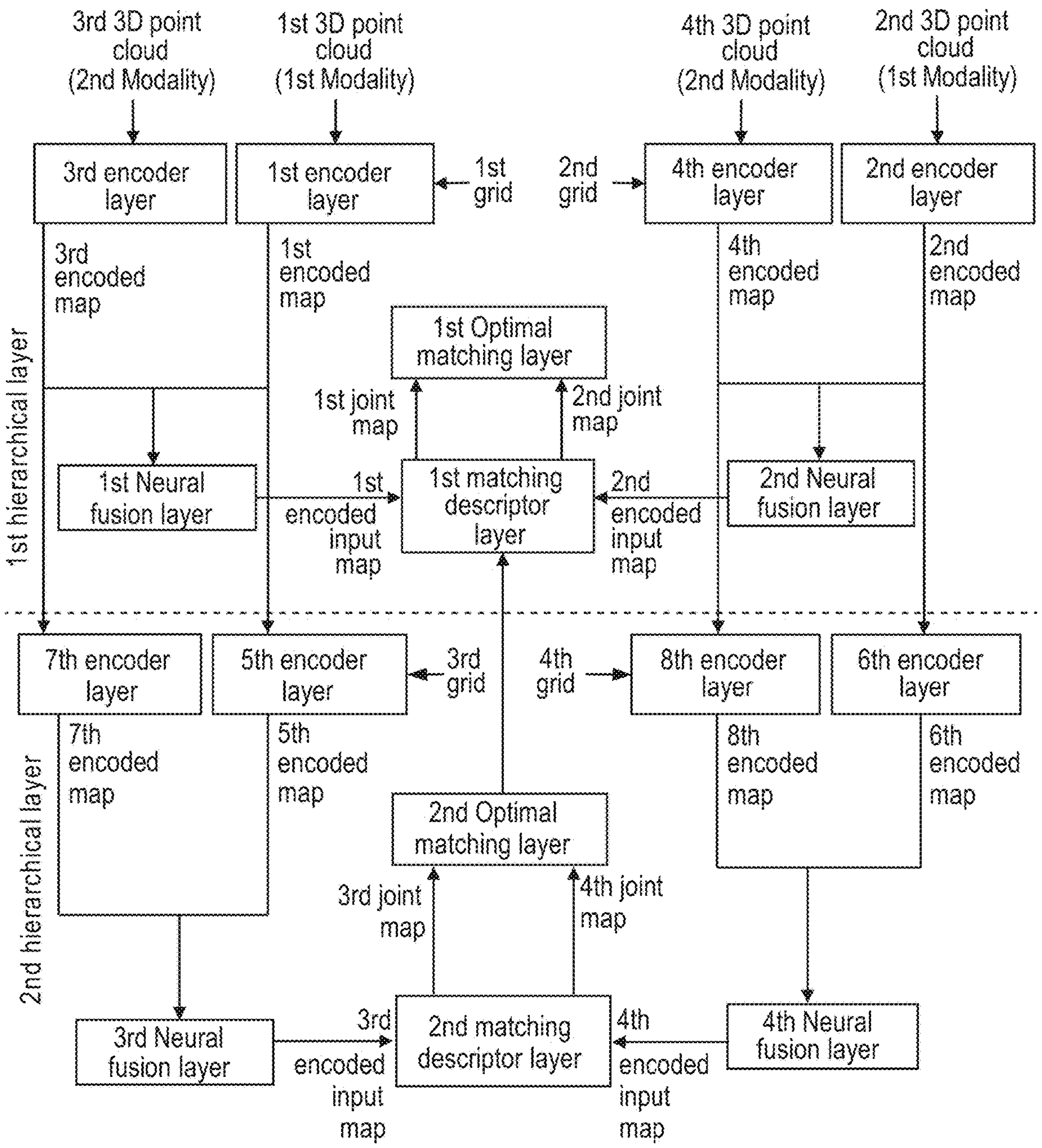
FIG. 5 shows a cutout of the functional structure of the example embodiment of FIG. 4.

FIG. 5 shows a cutout of the functional structure of the example embodiment of FIG. 4, comprising only the hierarchical layers 1 and 2. The output layer (including the transforming layer) is omitted. In FIG. 5, the terms as used in the claims and technical clauses are shown. These terms apply correspondingly to the claims and technical clauses related to the example embodiments of FIGS. 2 and 3.

Training Phase

Each of the example embodiments of FIGS. 2 to 4 has to be trained prior to inference (=query phase). For training, the global map is compared with a local map for which the ground truth is known. For example, such a local map may be generated by a subset of the images from which the global map was generated, using a mechanism like SLAM to generate the respective point cloud of the local map. However, the local map of the training data set is not restricted to the point cloud obtained from a subset of the images.

In the training phase, the point clouds of the global map and of the local map (potentially according to different modalities, depending on the embodiment) and the 3D grid are input into the system. Two loss terms may be calculated:

- A first loss function, L_corr, attempts to maximize the point correlations of the corresponding point pairs;
- A second loss function, L_geo, between the calculated transformation and the known transformation.

For the loss function L, these loss terms may be weighted and combined (e.g. $L=\alpha*L\_corr^{m}+\beta*L\_geo^{n}$, with $\alpha$, $\beta$, m, n being predefined constant values, for example m=n=1; other combinations of L_corr and L_geo are feasible, too). By iteration, the parameters of the different layers (structure encoder layer, neural fusion layer (if any), matching descriptor layer) are trained such that the predicted transformation fits sufficiently well with the actual transformation (the ground truth). Typically, as many epochs of iterations are performed until both the training loss function (the error of the model based on the training set used to initially train the model) and the validation loss function are decreasing and become smaller than a respective threshold. As an option, the training may be stopped after a predefined number of iterations is performed.

In the training phase of the example embodiment of FIG. 4, the point correspondences of the higher hierarchical layer may be not taken into account in the processing by the matching descriptor layer and the optimal matching layer of the lower hierarchical layer. I.e., the computational gain (saved calculation effort) may be obtained in the inference (query) phase only.

Aspects of Some Example Embodiments

Hereinafter, first, some aspects of some example embodiments are described from another point of view. Note that these aspects are not limiting.

Some example embodiments may be used to solve the loop closure, re-localization, and co-localization problems e.g. of a SLAM pipeline. Some example embodiments may have one or more of the following highlights:

- the re-localization, co-localization, and loop-closure problems are solved by using a sequence of images (instead of a single image) to create a 3D point cloud representation of the environment with a 3D reconstruction algorithm. Alternatively, a lidar point cloud can be also utilized, for example.
- to increase robustness and to make the use of large maps feasible, 6 DoF poses are registered to the RSSI values of different APs, called RF fingerprints;
- based on the structural information of the environment and the registered RF fingerprints, highly discriminative spatial matching descriptors (previously referred to as joint feature vectors) of different granularity are created in a data-driven way with a fully differentiable, trainable model. These new descriptors can help to solve the correspondence problem between point clouds. By getting accurate correspondences, one can compute the rigid transformation that aligns the point clouds;
- for creating the spatial matching descriptors, a fusion layer is used that creates fused feature vectors (previously referred to as joint feature vectors) by, for example, an attentional graph neural network architecture that uses self-attention and cross-attention to exchange information between the structural encodings and the RF encodings, fading and geometrical embeddings are defined for the attention stages that implicitly encode the RF propagation characteristics locally, resulting in better RF signal interpolation and extrapolation;

to achieve high accuracy rigid transformation estimation even on the coarsest layer, in the encoding layer the 3D position of the feature vectors is regressed as well in a data-driven, differentiable, and learnable way.

Some example embodiments accumulate the localization information from a sequence of images instead of using a single query image. By capturing the 3D structure of the environment and determining the poses of the camera, RF fingerprints may be registered to the 6 DoF camera poses. From these joint measurements, one may create spatial matching descriptors by training deep learning models that fuse the spatial information coming from the point clouds and RF fingerprints. Such spatial matching descriptors can be used to efficiently solve the map-to-map registration problem. If the registration fails because of non-overlapping maps, or if there is not enough information to remove the matching ambiguity, then the local map can be extended by acquiring more images until the matching is successful.

Some example embodiments significantly reduce the computational efforts by creating discriminative, hierarchical spatial matching descriptors that reduce the search space by registering the matching descriptors on the coarsest level first and continue the registration process only in regions that belong to the successfully registered coarse spatial matching descriptors.

To create robust and discriminative spatial matching descriptors for the feature points, the system of some example embodiments is end-to-end trainable via back-propagation, meaning that all the equations of every building block are differentiable. Based on the position of these descriptors matching for the different point clouds, one may estimate the rigid transformation for the point clouds alignment. The deep learning model takes as input, for example, an (already optimized) global map, containing the registered RF fingerprint maps, and the 3D point cloud describing the structure of the environment, and a bundle adjusted local map with the actual RF fingerprint measurements. These maps are encoded through a series of layers: structure and RF map encoder layer, fusion layer, spatial matching descriptor layer, the optimal matching layer, and the transformation layer.

In the encoder layer, the input map data is passed through a series of convolutional, normalization, activation and data compression layers. In some example embodiments, one may use point convolutions for encoding the point cloud features and the RF map features, but different embodiments may use other types of convolutions. The mathematical definition of the point convolutions is given further below. For normalization, several approaches could be applied. For example, data compression may be achieved through a grid partitioning mechanism. A series of grids is defined with increasing grid cell sizes. In the data compression layer, the space is partitioned by the chosen grid, and based on the data points that belong to each grid cell, the position of the output feature vector is defined. These points are referred to as feature center points. In certain embodiments, the output position (feature center point) for every grid cell may be calculated as the arithmetic mean of the grid cell data points position. The position of the feature vectors is highly important since the rigid transform (that aligns the two point clouds) is estimated based on the position of the feature vectors. Thus, several convolutional layers are used that regress the position of the output position. In case of point convolutions, as soon as the output position (feature center point) is determined, the support data points are selected based on some neighbourhood criteria (optional). Typically, a radius is defined around the output position, or the k-th closest points to the output position are selected. Based on the feature vectors of the support points, a feature vector is created for the output feature point. It is important to note that several point convolution iterations might happen between two compression layers. In this case, the position of the output feature points is identical with the position of the input feature points.

After every compression layer, the input-output data point connections may be stored. At inference time, the points that are on the highest/coarsest level are first registered. After the coarse registration, an initial rigid transformation is estimated based on the 3D position of the feature points and it is refined in an iterative way by further expanding the registered points and calculating a more refined transformation. In this hierarchical registration approach, there is no need to load the full set of feature points of the global localization map. The point registration will drive the loading of the relevant parts of the global map. Moreover, the computational complexity is reduced significantly, because only the relevant parts of the global map are given for the matching layers of the deep learning model.

The hierarchical approach will be particularly effective if the spatial matching descriptors of the feature points are highly discriminative. This may be achieved by transforming the RF fingerprints into RF spatial encodings, the 3D point clouds into structural encodings, and then fusing these encodings together through differentiable layers. While the 3D structure can be repetitive for industrial environments, the fingerprint maps can reduce the location ambiguity. Moreover, by encoding the structural representation with the RF signal measurements, the RF signal propagation could be better explained compared to existing models (Rayleigh fading, Rician fading, etc.), because the fading characteristics are implicitly encoded in the network. If the pose of the access points (APs) is known, then the geometrical encoding of the pose of the RF measurements, together with the pose of the APs becomes possible too.

The fusion layer may be built on an attentional graph neural network architecture, containing a self-attention stage and a cross-attention stage. In the self-attention stage, feature points of the same type are sharing information between each other through the attention mechanism, and in the cross-attention stage the structural encodings share information with the RF spatial encodings. In the self-attention stage, an embedding term is introduced that encodes channel characteristics in the form of path loss exponent, relative distance and orientation of the current measurement from its corresponding AP. In the cross-attention stage, a distance-based embedding is defined because the locations of the RF spatial encodings and structural encodings might differ. The outputs of the fusion layer are feature vectors with 3D position that encode structural and RF signal information. The exact mathematical formulation is presented further below.

The fused spatial feature vectors are given to the spatial matching descriptor layer. This is the first layer where the fused spatial feature vectors of the two point clouds to be matched can exchange information. An attentional graph neural network architecture is used to drive the information exchange. The outputs of this layer are called spatial matching descriptors. It is expected that feature points that describe the same regions in the global and local maps have similar descriptors.

In the optimal matching layer, a pairwise score matrix is computed as the similarity of the spatial matching descriptors. The pairwise score can be computed as an inner product or a Gaussian correlation between the feature vectors. The point matching problem can then be formulated as an optimal transport problem which maximizes a soft assignment matrix by the differentiable Sinkhorn algorithm. The local point correspondences are extracted by mutual top-k selection on the values of the soft-assignment matrix.

In the transformer layer, based on the point correspondences, the rigid transform estimation is formulated as a least squares problem that can be solved in closed form using differentiable weighted SVD. This layer has no learnable parameters, however, since it is differentiable, a loss function (loss term) can be defined between the estimated transformation and the ground truth transformation.

For the soft-assignment matrix another loss function (loss term) may be used, where the ground assignment matrix can be derived from the ground truth alignment transformation between the point clouds (which is known in the training phase).

Deep learning models created based on the above-described layers can solve the problem of re-localization, loop closure, and co-localization. For re-localization, a global map and a local map are given as inputs for the deep learning model. Because the global map may be the result of a SLAM pipeline, the hierarchical fused features can be pre-computed, thus at inference time only the local map may be encoded and the structural and RF features may be fused. For loop closure detection and co-localization, two local maps are inputs for the deep learning model. In this case, the feature points are always extracted from the local maps, because these are continuously changing, and the change may be propagated to the highest levels (the global map) as well.

It is known that the image based localization problem is hard to solve because the lightning conditions encountered during a day period or the seasonal changes in the environment introduce different artifacts. Creating visual descriptors and models that can generalize for every situation is particularly challenging. It is assumed that the image retrieval approach for solving the localization problem is not robust because of the afore-mentioned problems. By creating local maps for structure representation and registering the RF measurements together with camera poses, a better representation can be built for localization purposes. After a global map is built, different deep learning models can be trained to register the features of local maps created in different conditions. Nevertheless, it is also possible to train one model that generalizes to every condition by creating a set of local maps of the same region at different times of the day and/or season.

Localization, image retrieval algorithms, and data-driven trained models can be influenced heavily by camera lens distortion. Only suboptimal accuracy is achieved when the query images are created with different cameras than the keyframe images. Image un-distortion techniques help in alleviating this problem, but the result might be still suboptimal. In case of data-driven algorithms, the data distribution is defined by images in the training set. To create robust algorithms, a good way is to collect training images from a wide set of cameras having different distortion effects. This is useful because global maps are usually created with cameras having similar distortion parameters, but during localization, a wide variety of user equipment must be supported. Some example embodiments are camera agnostic since the camera image sequences are transformed to point clouds.

DETAILED DESCRIPTION OF AN EXAMPLE EMBODIMENT

Hereinafter, an example embodiment corresponding to FIG. 4 is explained in detail. Note that this example embodiment is not limiting.

Definition of Maps

The maps created by a SLAM pipeline contain the following elements: (i.) 3D map points $$\mathcal{P}^S = \{x_i^S \in \mathbb{R}^3 \mid i = 1, \ldots , N\}$$

and their corresponding descriptors or feature vectors $$\mathcal{F}^S = \{f_i^S \in \mathbb{R}^D \mid i = 1, \ldots , N\},$$

(ii.) pose of keyframes, (iii.) the pixel coordinates of the keypoints in different keyframes, (iv.) the covisibility graph of the keyframes. The associated feature vectors $\mathcal{F}^S \in \mathbb{R}^{|\mathcal{P}^S| \times D}$ could be feature point descriptors, semantical information, derived features such as offset from the arithmetic mean, offset from the center of a voxel, RGB colors, surface normal, reflectance value, etc. . . . ; the present example embodiment relies only on the map points and their associated feature vectors, so a structural SLAM map is defined as a set of 3D map points and their corresponding feature vectors $\mathcal{M}^S=(\mathcal{P}^S, \mathcal{F}^S)$.

Detailed RF measurements are captured with an agent that contains an RF module and a camera. A SLAM map is built based on the image sequence captured by the camera and register the RF measurements with 6DoF poses of the camera. Radio fingerprints contain the average received signal strength (RSS) from the surrounding WiFi access points (APs), base stations, Bluetooth devices. In case of K number of access points in the mapped region, the radio maps $\mathcal{M}^{RF}=(\mathcal{P}^{RF}, \mathcal{F}^{RF})$ can be defined as a set of RF points $$\mathcal{P}^{RF} = \{x_i^{RF} \in \mathbb{R}^3 \mid i = 1, \ldots , M\},$$

namely the 3D coordinates of the places where RF measurements were taken, and their associated feature vector $$\mathcal{F}^{RF} = \{(q_i^{RF}, f_i^{RF}) \in \mathcal{S}^3 \times \mathbb{R}^K \mid i = 1, \ldots , M\},$$

where $$q_i^{RF} \in \mathcal{S}^3$$

is an element of the unit quaternion group, representing the orientation of the UE while registering the measured RSS values of the APs stored in the fingerprint feature vector $$f_i^{RF}=(RSS_1, RSS_2, \ldots , RSS_K).$$

Optionally, if the pose of the APs in the map are known, the 3D coordinates of APs are defined in set $$\mathcal{P}^{\mathcal{AP}}=\{x_i^{AP}\in\mathbb{R}^3 \mid i=1, \ldots , K\}$$

and the orientation part is stored in feature set $$\mathcal{F}^{\mathcal{AP}}=\{q_i^{AP}\in\mathcal{S}^3 \mid i=1, \ldots , K\}$$

of the APs. This extra information could help in creating distance-, orientation- and propagation-based encodings. In this example embodiment, for simplicity, K, the number of APs in the mapped environment, is known and constant.

Definition of the Problem

A goal is to align a local SLAM map within a global SLAM map or to align two different local SLAM maps, but for simplicity, one may consider two point clouds. Given two point clouds $\mathcal{P}\in\mathbb{R}^{N\times 3}$ and $\mathcal{Q}\in\mathbb{R}^{M\times 3}$, a main task is to estimate a rigid transformation $T\in SE(3)$ belonging to the special Euclidean group, which aligns the two point clouds by minimizing the following equation $$\min_T \sum_{(x_i^p, x_j^q)\in\mathcal{C}} \|T\cdot x_i^p - x_j^q\|_2^2,$$

where $\mathcal{C}$ denotes the set of correspondences between the points of the point clouds $\mathcal{P}$ and $\mathcal{Q}$, but it is unknown and it is the subject of the registration problem, $$x_i^p\in\mathcal{P}$$

is an element of the first point cloud and $$x_i^q\in\mathcal{Q}$$

is an element of the second point cloud. One of the outputs of the deep learning fusion model are the point correspondences between the two point clouds. As soon as there is a minimal set of correspondences found, the rigid transformation T can be computed.

Building Blocks of the Neural Network

Map Encoder Layer

Encoding point clouds is challenging because the data is not well structured like image data. Several encoding techniques exist like: (i.) projection networks, where points are projected to regular 2D and 3D grid structures followed by regular 2D or 3D convolutional operators, (ii.) graph convolution networks, (iii.) point-wise multi-layer perceptron networks or (iv.) point convolutional networks. The point cloud encoder layer in different embodiments can implement different point cloud encoding strategies. A main goal is to create representations that encode the structure of the environment and the measured RF signals in a hierarchical and transformation-invariant way.

In this section, the details of the encoder layer are formalized. The encoder layer is applied in parallel to the structural maps and the RF maps as well. The encoder layer is defined by a collection of convolutional, normalization, activation, and data compression operations.

Convolutions: Since the point cloud data is unstructured, the convolutional operator is redefined. In the present example embodiment, the following approach for encoding the point cloud features and the RF map features is adopted, but other example embodiments may use different types of convolutions.

For points $x_i\in\mathcal{P}^{N\times 3}$ and their corresponding features $f_i\in\mathcal{F}^{N\times D}$, the convolution of $\mathcal{F}$ by a kernel g at center point $x\in\mathbb{R}^3$ is defined as $$(\mathcal{F}*g)(x)=\sum_{x_i\in N_x} g(x_i-x)f_i.$$

$\mathcal{N}_x$ is the neighborhood of center point that can be defined in several ways. The most common approaches are to take the k-nearest neighbours of center point x or to define a sphere with radius r around the center point, therefore the neighborhood set is defined as $\mathcal{N}_x=\{x_i\in P \mid \|x_i-x\|\le r\}$. As the radius r defines the neighborhood, the domain of operation of kernel function g is defined by unit sphere $\mathcal{B}_r^3=\{y\in\mathbb{R}^3 \mid \|y\|\le r\}$. The kernel function g for a point $y_i\in\mathcal{B}_r^3$ is defined as $$g(y_i)=\sum_{k<K} h(y_i, \tilde{x}_k)W_k,$$

where $\{\tilde{x}_k \mid k<K\}\subset\mathcal{B}_r^3$ are the kernel points and $\{W_k \mid k<K\}\subset\mathbb{R}^{D_{in}\times D_{out}}$ the associated weight matrices that map features from dimension $D_{in}$ to $D_{out}$ and h is a linear correlation function with user defined parameter σ defined as $$h(y_i, \tilde{x}_k)=\max\left(0, 1-\frac{\|y_i-\tilde{x}_k\|}{\sigma}\right).$$

In embodiments where the encoder layer is formulated by consecutive point convolutional operations, the output locations x will be identical with all the input points location. As a result, the number of evaluated convolutions equals N.

Normalization: Normalization layers play an important role in increasing the convergence of the training. Several different approaches may be applied.

Data compression: In case of large point clouds, it is impractical to create models that only use point convolutions, since the number of convolution evaluations equals the number of input points. By applying data compression, the number of points is reduced and becomes structurally better organized. Data compression is achieved through a grid partitioning mechanism. A set of 3D grids are defined with increasing cell sizes. When data compression is performed, the goal is to define: (i.) structural and RF descriptors encoded as feature vectors for every grid cell and (ii.)

regress the feature (center) point coordinates for the structural and RF descriptors that will be used in computing the rigid transform T. On the lower hierarchical layers, the size of the grid cells are smaller and as one gets closer to the coarsest resolution, the size of grid cells is increased.

The point compression operation for one grid configuration is formulated as follows: (i.) define a 3D grid with a given grid cell size, (ii.) group the input points based on the grid cells, (iii.) regress the position of the output feature center point and any extra parameters of the chosen convolution type, (iv.) define the support points for every feature center point (the set of the support points is the collection of the neighbouring points of the feature center points, typically defined by the radius of the convolutions or based on the neighbourhood selection algorithms, furthermore the radius of the convolution might be equal to or larger or smaller than the size of the grid cell), (vi.) create a structural or RF descriptor for every grid cell based on the points inside the cell by performing several groups of convolution, normalization and activation operations.

For the upcoming data compression, the size of the grid cells is increased, and the point cloud encoding is continued in the above-described way. The structural descriptors, and the center positions are created in a data-driven way to produce good feature vectors for point registration and pose estimation.

By using the above presented kernel point convolution, one may create the desired structural and RF descriptor and the output feature center points with a two-stage kernel point convolution. In the first stage, the center point $\tilde{x}_j$ for grid cell $\mathcal{C}_j$ is defined as the arithmetic mean of the points that are inside the cell $x_i \in \mathcal{C}_j^{N_j \times 3}$ and the expected output is a new center point $$x_j^c$$

that serves in the second stage as basis for computing structural descriptor. The structural descriptor is computed in the second stage at the regressed center point $$x_j^c.$$

It is important to note that this two-stage operation is used because the position of the encoded vectors play an important role in determining the rigid transformation T aligning the point clouds.

The encoding of the RF maps (i.e., RF measurements registered at 3D locations) happens in a similar way. Since the position of the fingerprint measurements may be structurally sparser than the reconstructed point cloud (and note that the RF measurement 3D locations are not the same as the structure 3D points), it might be beneficial if the hierarchical encoding happens in less stages, but this is a design choice that might differ in different example embodiments. It is recommended to use the same grid configurations for layers where the RF features are fused with the structural features. The feature center points of the RF maps and structure maps are usually separate locations; thus, this must be handled in the fusion process. Furthermore, when applying the data compression layer to the RF maps, instead of regressing a feature center point, a measurement point is selected as a feature center point. A trivial selection could be a measurement point which contains the most valid RSS measurements in the fingerprint feature vector, or the closest measurement point to the arithmetic mean of the measurement positions in a grid cell. The motivation of choosing a measurement point as a feature center point is the availability of the RF fingerprint feature vector that will be used for creating RF embeddings in the attention mechanism. The estimation of the RF fingerprint vector in a new position introduces inaccuracies. By sticking center points to selected measurement points $$x_i^{RF},$$

the accuracy of the final rigid transform is not affected because the output positions of the fusion layer are learnt structural center points. A more detailed explanation is given in the fusion layer description.

The hierarchical features are created by applying data compression iteratively. After defining the feature center points for a new grid configuration, a point-to-node grouping is performed. The point-to-node grouping can be implemented based on several heuristics. Every point $x \in P_l$ and its corresponding feature vector $f \in F_l$ at layer l are assigned to the closest center point $$G_j^{P_l} = \{x \in P_l \mid \|x - x_i^{c_l}\| \le \|x - x_j^{c_l}\|, \forall j \ne i\},$$
$$G_j^{F_l} = \{f \in F_l \mid f \leftrightarrow x \text{ with } x \in G_j^{P_l}\{.$$

The point registration process starts at the coarsest level and the rigid pose transform is refined in an iterative way by expanding the registered nodes and recomputing a refined pose. More formally, if feature center point $$P_{x_i^{c_l}}$$

from point cloud P is registered to feature center point $$Q_{x_j^{c_l}}$$

from point cloud Q, then, if the refinement of the estimated rigid transform is required, a new matching is performed by the optimal matching layer between the matching descriptors of the points in the sets $$G_i^{P_l} \text{ and } G_j^{Q_l}.$$

Fusion Layer

The fusion architectures of the RF features and structural features can be designed in many ways. In certain embodiments, the features at certain levels having the same grid cell size are concatenated, followed by several convolutional layers.

In this example embodiment, a graph neural network architecture with attention mechanism is used. It is assumed that the attention mechanism can better capture the propagation characteristics of the RF signals within large environments compared to a group of convolutional layers, because information sharing happens among all points where valid RSS measurements were taken. By fusing the sparse RF encodings with the structural encodings, a better prediction of the RF signal propagation and a more unique description of any 3D location in the world is expected.

In order to share the structural information between the feature center points, a sequence of self- and cross-attention modules is adopted. By aggregating this information, feature vectors are created which are expected to have better global contextual information facilitating the registration problem.

Self-attention of the structural features: In the following, the single headed self-attention mechanism is formalized for the structural feature vectors. (A multi-headed attentional mechanism could be used in another example embodiment)

Given the structural feature vectors $\mathcal{F}^{S_l} \in \mathbb{R}^{|\mathcal{P}^{S_l}| \times D}$ of layer l, in the self-attention phase the transformed output feature vectors $Z^{S_l} \in \mathbb{R}^{|\mathcal{P}^{S_l}| \times D}$ are computed as the weighted sum of all projected input features $$z_i^{S_l} = \sum_{j=1}^{|\mathcal{P}^{S_l}|} a_{i,j}\left(f_j^{S_l} \cdot W_l^V\right),$$

where $a_{i,j}$ is the weight coefficient between elements i and j and it is computed based on the attention scores $e_{i,j}$ as follows $$e_{i,j} = \frac{\left(f_i^{S_l} \cdot W_l^Q\right)\left(f_j^{S_l} \cdot W_l^K + r_{i,j} \cdot W_l^R\right)^T}{\sqrt{D}}$$

where $$W_l^Q, W_l^K, W_l^V, W_l^R \in \mathbb{R}^{D \times D}$$

are the respective projection matrices for queries, keys, values and geometric structure embeddings for the l-th layer and $T_{i,j}$ is the relative distance embedding between feature center points $$x_i^{S_l} \text{ and } x_j^{S_l}.$$

The weights of these matrices are updated during the learning process. Finally, the weighting coefficient $a_{i,j}$ is computed with the softmax activation function as follows:

$$a_{i,j} = \frac{e^{e_{i,j}}}{\Sigma_{k=1}^{|P_l|} e^{e_{i,k}}}.$$

The relative distance embedding is defined by the distance $$\rho_{i,j} = \left\| x_i^{S_l} - x_j^{S_l} \right\|_2$$

between the coordinates $$x_i^{S_l}, x_j^{S_l}$$

by applying sinusoidal encoding. By using sinusoidal encoding, high frequency structural changes can be better represented for the network. The sinusoidal encoding function p: $\mathbb{N} \to \mathbb{R}^D$ of distance $\beta_{i,j}$ for the relative distance embedding $r_{i,j} \in \mathbb{R}^D$ is defined as follows:

$$r_{i,j} = p(\rho_{i,j}) = \begin{cases} r_{i,j,2k} = \sin\left(\frac{\rho_{i,j}}{n^{\frac{2k}{D}}}\right) \\ r_{i,j,2k+1} = \cos\left(\frac{\rho_{i,j}}{n^{\frac{2k}{D}}}\right) \end{cases},$$

where n is a user-defined scalar.

Self-attention of the RF features: In order to create a transformation-invariant RF propagation embedding, an RF embedding mechanism is used. The self-attention module for the RF feature vectors $\mathcal{F}^{RF_l} \in \mathbb{R}^{|\mathcal{P}^{RF_l}| \times D}$ at layer l can be defined as follows:

$$z_i^{RF_l} = \sum_{j=1}^{|P^{RF_l}|} a_{i,j}\left(f_j^{RF_l} \cdot W_l^V\right),$$

where the attention scores $e_{i,j}$ required for computing the weighting coefficients $a_{i,j}$ incorporate the RF embeddings as follows $$e_{i,j} = \frac{\left(f_i^{RF_l} \cdot W_l^Q\right)\left(f_j^{RF_l} \cdot W_l^K + rf_{i,j} \cdot W_l^{RF}\right)^T}{\sqrt{D}},$$

where $$W_l^{RF} \in \mathbb{R}^{D \times D}$$

is the projection matrix for the RF embedding in the l-th layer. Since the position of the feature vectors $$f_j^{RF_l}$$

correspond to some initial measurement point $$x_i^{RF},$$

the original RF fingerprint vectors and orientation could be used for creating RF embeddings for the attentional mechanism. The definition of the RF embedding $rf_{i,j}$ depends on whether the position of the APs is known or not. If the position of the APs is not defined, the RF embedding $rf_{i,j}$ is ignored.

In the case when the pose of the APs is registered, the RF embedding is defined by three terms: the distance (relative position) encoding $$r^d_{i,AP},$$

the angular distance (relative orientation) encoding $$r^o_{i,AP}$$

of the measurement orientation and the APs orientations, and the fading encoding $$r^f_{i,j}.$$

The RF embedding term $rf_{i,j}$ can be computed as follows:

$$rf_{i,j} = (r^d_{i,AP} + r^d_{j,AP})W^D + (r^o_{i,AP} + r^o_{j,AP})W^O + r^f_{i,j} \cdot W^F$$

where matrices $W^D$, $W^O$, $W^F \in \mathbb{R}^{D \times D}$ transform the distance, orientation and fading encodings to the output dimensions D.

The sinusoidal encoding of the distance between the measurement point $$x_i^{RF_l}$$

and the position of the j-th Ap $$x_j^{AP},$$

if the measured RSS level of the j-th AP is above a certain threshold, is defined as $$r^d_{i,AP} = \sum\nolimits_{j=1}^{K} w_j p\left(\left\|x_i^{RF_l} - x_j^{AP}\right\|_2\right), \begin{cases} w_j = 1 & \text{if } RSS_j > \tau \\ w_j = 0 & \text{otherwise} \end{cases}.$$

The sinusoidal encoding of the relative orientation between the i-th measurement point the j-th AP is encoded as follows $$r^o_{i,AP} = \sum\nolimits_{j=1}^{K} \sum\nolimits_{c=1}^{3} w_j \cdot p\left(R\{q_i^{RF}\}_c \cdot R\{q_j^{AP}\}_c^T\right), \begin{cases} w_j = 1 & \text{if } RSS_j > \tau \\ w_j = 0 & \text{otherwise} \end{cases},$$

where $R\{q\} \in SO(3)$ denotes the rotational matrix equivalent of the rotational quaternion q and subscript c denotes the c-th column of the rotational matrix.

In the fading embedding, a goal is to implicitly encode the path loss exponent. The log-distance path loss model is formally defined as follows $$PL(d)[\text{dB}] = P_{Tx}[\text{dBm}] - P_{Rx}[\text{dBm}] = PL(d_0)[\text{dB}] + 10 \cdot n \cdot \log_{10}\left(\frac{d}{d_0}\right)$$

where PL is the total path loss in decibels (dBs), $P_{Tx}$ is the transmitted power in decibel-milliwatts (dBm), $P_{Rx}$ is the received power in dBm (this is the actual RSS value), $PL(d_0)$ is the path loss in dBs at the reference distance $d_0$ calculated using the Friis free-space path loss model and n is the path loss exponent. In the fading embedding, the fact is exploited that the line-of-sight distance between the AP and the measurement positions is known, thus the path loss exponent is calculated as follows $$PL(d_{i,k}) - PL(d_{j,k}) = RSS_k(d_{j,k}) - RSS_k(d_{i,k}) = 10 \cdot n \cdot (\log_{10}(d_{i,k}) - \log_{10}(d_{j,k}))$$

$$n = \frac{RSS_k(d_{j,k}) - RSS_k(d_{i,k})}{10 \cdot (\log_{10}(d_{i,k}) - \log_{10}(d_{j,k}))},$$

where $$d_{i,k} = \left\|x_i^{RF} - x_k^{AP}\right\|_2 \text{ and } d_{j,k} = \left\|x_j^{RF} - x_x^{AP}\right\|_2.$$

The sinusoidal encoding of the fading embedding is formulated as follows $$r^f_{i,j} = \sum\nolimits_{k=1}^{K} w_k \cdot p\left(\frac{RSS_k(d_{j,k}) - RSS_k(d_{i,k})}{10 \cdot (\log_{10}(d_{i,k}) - \log_{10}(d_{j,k}))}\right), \begin{cases} w_k = 1 & \text{if } RSS_k > \tau \\ w_k = 0 & \text{otherwise} \end{cases}$$

Cross-attention of the RF and structural features: The output RF feature vectors $Z^{RF_l} \in \mathbb{R}^{|P^{RF}{}_l| \times D}$ and the output structural feature vectors $Z^{S_l} \in \mathbb{R}^{|P^{S}{}_l| \times D}$ of the self-attention encoding stage are the inputs of the cross-attention stage. The cross-attention stage consists of two steps. In the first step, the RF feature vectors are updated by computing the query values based on the RF feature vectors, the key and value components based on the structural feature vectors, in the second step the structural feature vectors are updated by computing the query values based on the structural feature vectors, the key and value components based on the RF feature vectors. The distance embeddings between the feature centers are also added in the attention mechanism.

The update of the RF feature vectors in the first step is formalized as follows:

$$z_i^{RF_l} = \sum\nolimits_{j=1}^{|P^{S_l}|} = a_{i,j}\left(z_j^{S_l} \cdot W_l^V\right),$$

$$e_{i,j} = \frac{\left(z_i^{RF_l} \cdot W_l^Q\right)\left(z_j^{S_l} \cdot W_l^K + r_{i,j} \cdot W_l^R\right)^T}{\sqrt{D}}.$$

The update of the structural feature vectors in the second step is formalized as follows:

$$z_i^{S_l} = \sum\nolimits_{j=1}^{|P^{RF_l}|} a_{i,j}\left(z_j^{RF_i} \cdot W_l^V\right),$$

$$e_{i,j} = \frac{\left(z_i^{S_l} \cdot W_l^Q\right)\left(z_j^{RF_l} \cdot W_l^K + r_{i,j} \cdot W_l^R\right)^T}{\sqrt{D}}.$$

The cross-attention stage is the step when the structural and the RF information is shared and fused. After several iterations of self- and cross-attention steps, the final fusion feature vectors $F\in \mathbb{R}^{|P^{S_l}|\times D}$ are created. As mentioned earlier, the output of the fusion layer are the center points of the structural feature vectors because these center points are learnt in the map encoder layer (center points for the RF maps are not regressed, in order to be able to create RF embedding if the pose of the APs are known). This is the reason why the first dimension of the fused feature vectors F equals the number of structural points in layer l.

In other example embodiments, the RF center points could be regressed as well and could be used as the output of the fusion layer.

For every iteration when the attention mechanism is computed, new trainable projection matrices are used.

Matching Descriptor Layers

The matching descriptor layer is responsible for exchanging information between the fused feature vectors of two different point clouds P and Q and to create matching descriptors that will be used to compute the similarity scores of different regions in the point clouds.

Given the fused feature vectors $F^{P_l}\in \mathbb{R}^{|^P P^{S}_l|\times D}$ of point cloud P at layer l and $F^{Q_l}\in \mathbb{R}^{|^Q P^{S}_l|\times D}$ of point cloud Q at layer l, with $|^P P^{S_l}|$ and $|^Q P^{S_l}|$ denoting the number of structural feature vectors for point clouds P and Q at layer l, the matching feature vectors $M^{P_l}\in \mathbb{R}^{|^P P^{S}_l|\times M}$ and $M^{Q_l}\in \mathbb{R}^{|^Q P^{S}_l|\times M}$ are computed based on the attention mechanism. Similar to the fusion layer, several self- and cross-attention steps are performed between the fused feature vectors in order to get the matching descriptors.

In the self-attention step, the feature vectors are updated as follows:

$$f_i^{P_l/Q_l} = \sum_{j=1}^{|^{P/Q}P^{S_l}|} a_{i,j}\left(f_j^{P_l/Q_l}\cdot W_l^{V_M}\right),$$

$$e_{i,j} = \frac{\left(f_i^{P_l/Q_l}\cdot W_l^{Q_M}\right)\left(f_j^{P_l/Q_l}\cdot W_l^{K_M}\right)^T}{\sqrt{D}},$$

where the notation P/Q denotes that the feature vector updates have to be performed for both feature sets $F^{P_l}$ and $F^{Q_l}$. The weighting coefficient $a_{i,j}$ is computed in a similar way as presented in the previous section.

In the cross-attention stage, the attention mechanism is applied as follows:

$$f_i^{P_l} = \sum_{j=1}^{|^Q P^{S_l}|} a_{i,j}\left(f_j^{Q_l}\cdot W_l^{V_M}\right).$$

In the cross-attention stage, the weight coefficient is computed based on the cross-attention scores $$e_{i,j} = \frac{\left(f_i^{P_l}\cdot W_l^{Q_M}\right)\left(f_j^{Q_l}\cdot W_l^{K_M}\right)^T}{\sqrt{D}}.$$

The cross-attention features $F^{Q_l}$ are computed in a similar way.

Finally, the attention features are transformed by the projection matrix $$W_l^M \in \mathbb{R}^{D\times M}$$

into the matching features $M^{P_l}\in \mathbb{R}^{|^P P^{S}_l|\times M}$ as follows $$m_i^{P_l} = f_i^{P_l}\cdot W_l^M \text{ and } m_i^{Q_l} = f_i^{Q_l}\cdot W_l^M.$$

In other example embodiments, a multi-headed architecture may be feasible. In this case, the number of projection matrices are increased.

For every iteration, when the attention mechanism is computed new trainable projection matrices are used.

Optimal Matching Layer

In the optimal matching layer, the matching descriptors are used to compute the similarity matrix $S_l\in \mathbb{R}^{|^P P^{S}_l|\times|^Q P^{S}_l|}$ for layer l by computing the cosine similarity between each pair of features $$S_l = M^{P_l}\cdot\left(M^{Q_l}\right)^T.$$

In order to be able to mark that certain feature points cannot be registered, matrix $S_l$ is extended by a dustbin row and column resulting in matrix $\overline{S}_l\in \mathbb{R}^{(|^P P^{S}_l|+1)\times(|^Q P^{S}_l|+1)}$. The unmatched feature points are explicitly assigned to the dustbin dimension. The dustbin row and column are initialized by a learnable parameter that is optimized during the training process. In the second step a soft-assignment matrix $A_l\in \mathbb{R}^{(|^P P^{S}_l|+1)\times(|^Q P^{S}_l|+1)}$ is computed for layer l that contains matching probabilities for each pair of features. The optimal assignment is found by solving an optimal transport problem that is formulated as maximizing the following sum $$\sum_{i,j}\overline{S}^l_{i,j}\cdot A^l_{i,j}$$

subject to the following constraints $$\sum_{i=1}^{|^P P^{S_l}|+1} A^l_{i,j} = \begin{cases} 1 & \text{for } 1\le j\le |^Q P^{S_l}| \\ |^P P^{S_l}| & \text{for } j = |^Q P^{S_l}|+1 \end{cases},$$

$$\sum_{j=1}^{|^Q P^{S_l}|+1} A^l_{i,j} = \begin{cases} 1 & \text{for } 1\le i\le |^P P^{S_l}| \\ |^Q P^{S_l}| & \text{for } i = |^P P^{S_l}|+1 \end{cases}.$$

The soft-assignment matrix $A^l$ can be computed in a differentiable way by the Sinkhorn algorithm. The local point correspondences are extracted by mutual top-k selection on the values of the soft assignment matrix $A^l$.

Transformer Layer

By defining the correspondences between the matching feature points, the rigid transform estimation is formulated as a least squares problem that can be solved in closed form using differentiable weighted SVD. This layer has no learnable parameters, however, since it is differentiable, a loss function can be defined between the estimated transformation and the ground truth transformation.

The accuracy of the estimated pose can be further refined by expanding the feature points at layer l, and computing the matching between the expanded features at lower layers. The accuracy is improved because the number of feature points are larger and the quantization effects of the center selection process introduce less errors. The registration at lower layers happens only between points where the parent nodes were previously registered. By this mechanism, fast registration can be achieved even for big maps.

Loss Functions

Since every layer presented previously is fully differentiable, the training of the deep learning models can be conducted by a training loss that is defined based on the predicted rigid transformation at layer l $$T^l_{pred} = \begin{bmatrix} R^l_{pred} & t^l_{pred} \\ 0 & 1 \end{bmatrix}$$

and the ground truth transformation $$T_{gt} = \begin{bmatrix} R_{gt} & t_{gt} \\ 0 & 1 \end{bmatrix}.$$

A possible geometric loss function can be formulated for layer l as follows:

$$L^l_{geo} = \left\|\log\left(R^l_{pred} \cdot R^{-1}_{gt}\right)\right\|_2 + \lambda_l \left\|t^l_{pred} - t_{gt}\right\|,$$

where $\lambda_l$ is a user defined hyperparameter.

For the soft-assignment matrix $A^l$ a log-likelihood loss is defined of each point correspondence. Since in the training phase the ground truth correspondence $$C^*_l$$

for layer l is known, the corresponding point pairs can be defined, thus the loss function for layer l can be defined as follows:

$$L^l_{corr} = -\sum\nolimits_{(i,j)\in C^*_l} \log A^l_{i,j} - \sum\nolimits_{i\in I} \log A^l_{i,\left|Q_P S_l\right|+1} - \sum\nolimits_{i\in J} \log A^l_{\left|P_P S_l\right|+1,j}$$

where $C_l$* denotes the ground truth correspondence set for the l-th layer, I and J are sets for the unmatched feature points.

The total loss can be formulated as follows:

$$L_{total} = \sum\nolimits_l L^l_{geo} + \lambda'_l L^l_{corr},$$

where $\lambda_l$' is a user defined hyperparameter.

A General Example Embodiment

Figure 6:
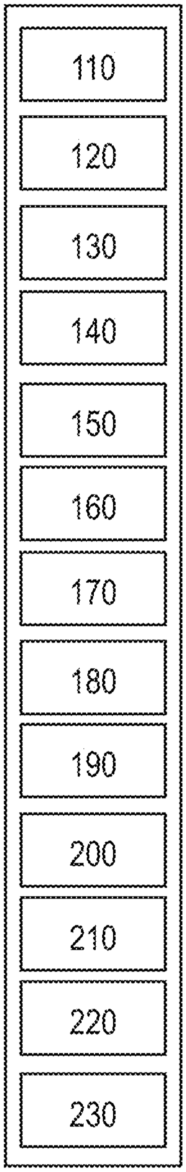
FIG. 6 shows an apparatus according to an example embodiment.

FIG. 6 shows an apparatus according to an example embodiment. The apparatus may be a localization device or an element thereof. FIG. 7 shows a method according to an example embodiment. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises $1^{st}$ to $4^{th}$ means for inputting 110, 130, 140, 160, $1^{st}$ and $2^{nd}$ means for encoding 120, 150, $1^{st}$ and $2^{nd}$ means for adapting 170, 180, $1^{st}$, $2^{nd}$, and 3rd means for calculating 190, 200, 230, means for checking 210, and means for extracting 220. The $1^{st}$ to $4^{th}$ means for inputting 110, 130, 140, 160, $1^{st}$ and $2^{nd}$ means for encoding 120, 150, $1^{st}$ and $2^{nd}$ means for adapting 170, 180, $1^{st}$, $2^{nd}$, and $3^{rd}$ means for calculating 190, 200, 230, means for checking 210, and means for extracting 220 may be $1^{st}$ to $4^{th}$ inputting means, $1^{st}$ and $2^{nd}$ encoding means, $1^{st}$ and $2^{nd}$ adapting means, $1^{st}$, $2^{nd}$, and $3^{rd}$ calculating means, checking means, and extracting means, respectively. The $1^{st}$ to $4^{th}$ means for inputting 110, 130, 140, 160, $1^{st}$ and $2^{nd}$ means for encoding 120, 150, $1^{st}$ and $2^{nd}$ means for adapting 170, 180, $1^{st}$, $2^{nd}$, and $3^{rd}$ means for calculating 190, 200, 230, means for checking 210, and means for extracting 220 may be $1^{st}$ to $4^{th}$ inputter, $1^{st}$ and $2^{nd}$ encoder, $1^{st}$ and $2^{nd}$ adapters, $1^{st}$, $2^{nd}$, and $3^{rd}$ calculators, checker, and extractor, respectively. The $1^{st}$ to $4^{th}$ means for inputting 110, 130, 140, 160, $1^{st}$ and $2^{nd}$ means for encoding 120, 150, $1^{st}$ and $2^{nd}$ means for adapting 170, 180, $1^{st}$, $2^{nd}$, and $3^{rd}$ means for calculating 190, 200, 230, means for checking 200, and means for extracting 210 may be $1^{st}$ to $4^{th}$ inputting processor, $1^{st}$ and $2^{nd}$ encoding processor, $1^{st}$ and $2^{nd}$ adapting processor, $1^{st}$, $2^{nd}$, and $3^{rd}$ calculating processor, checking processor, and extracting processor, respectively.

The first means for inputting 110, first means for encoding 120, and second means for inputting 130 configure a first pipeline. The third means for inputting 140, second means for encoding 150, and fourth means for inputting 160 configure a second pipeline. The actions of the first pipeline may be performed independently from the actions of the second pipeline, and the actions of the second pipeline may be performed independently from the actions of the first pipeline. They actions of the first pipeline may be performed in an arbitrary time sequence relative to the actions of the second pipeline. The actions of the first pipeline may be performed fully or partly in parallel with the actions of the second pipeline.

The first means for inputting 110 inputs a first 3D point cloud of a first modality and a first grid into a first encoder layer (S110). The first grid comprises one or more first cells. The coordinates of points of the first 3D point cloud are indicated in a first coordinate system.

The first means for encoding 120 encodes, by the first encoder layer, the first 3D point cloud of the first modality into a first encoded map of the first modality (S120). The first encoded map of the first modality comprises, for each of the first cells of the first grid, a respective first feature center point and a respective first feature vector. The coordinates of the first feature center points are indicated in the first coordinate system.

The second means for inputting 130 inputs a first encoded input map into a first matching descriptor layer of a first hierarchical layer (S130). The first encoded input map is based on the first encoded map of the first modality. The first encoded input map comprises, for each of the first cells, a respective first joint feature center point and a respective first input feature vector. The coordinates of the first joint feature center points are indicated in the first coordinate system.

The third means for inputting 140 inputs a second 3D point cloud of the first modality and a second grid comprising one or more second cells into a second encoder layer (S140). The coordinates of points of the second 3D point cloud are indicated in a second coordinate system. The second coordinate system may or may not be different from the first coordinate system.

The second means for encoding 150 encodes, by the second encoder layer, the second 3D point cloud of the first modality into a second encoded map of the first modality (S150). The second encoded map of the first modality comprises, for each of the second cells of the second grid, a respective second feature center point and a respective second feature vector. The coordinates of the second feature center points are indicated in the second coordinate system.

The fourth means for inputting 160 inputs a second encoded input map into the first matching descriptor layer (S160). The second encoded input map is based on the second encoded map of the first modality. The second encoded input map comprises, for each of the second cells, a respective second joint feature center point and a respective second input feature vector. The coordinates of the second joint feature center points are indicated in the second coordinate system.

After the activities S110 to S130 and S140 to S160 of the two pipelines are performed, the activities of S170 to S230 may follow.

The first means for adapting 170 adapts, by the first matching descriptor layer, each of the first input feature vectors based on the first input feature vectors and the second input feature vectors to obtain a first joint map (S170). Optionally, the first matching descriptor layer may adapt each of the first input feature vectors based on the first input feature vectors with their first feature center points and/or based on the second input feature vectors with their second feature center points. The first joint map comprises, for each of the first joint feature center points, a respective first joint feature vector.

The second means for adapting 180 adapts, by the first matching descriptor layer, each of the second input feature vectors based on the first input feature vectors and the second input feature vectors to obtain a second joint map (S180). Optionally, the first matching descriptor layer may adapt each of the second input feature vectors based on the first input feature vectors with their first feature center points and/or based on the second input feature vectors with their second feature center points. The second joint map comprises, for each of the second joint feature center points, a respective second joint feature vector.

The first means for calculating 190 calculates, by a first optimal matching layer of the first hierarchical layer, for each of the first cells and each of the second cells, a similarity between the first joint feature vector of the respective first cell and the second joint feature vector of the respective second cell (S190).

The second means for calculating 200 calculates, by the first optimal matching layer, for each of the first cells and each of the second cells, a first point correlation between the respective first cell and the respective second cell (S200). The first point correlation is calculated based on the similarities between the first joint feature vector of the respective first cell and the second joint feature vectors of the second cells and based on the similarities between the second joint feature vector of the respective second cell and the first joint feature vectors of the first cells.

The means for checking 210 checks, for each of the first cells and each of the second cells, whether at least one of one or more first correlation conditions is fulfilled (S210). The one or more correlation conditions comprise:

- the first point correlation between the respective first cell and the respective second cell is larger than a first correlation threshold of the first hierarchical layer; or
- the first point correlation between the respective first cell and the respective second cell is among the largest k values of the first point correlations, and k is a fixed value.

In response to checking that that the at least one of the one or more first correlation conditions for the respective first cell and the respective second cell is fulfilled (S210=yes), the means for extracting 220 extracts, for each of the first cells and each of the second cells, the coordinates of the first joint feature center point of the respective first cell in the first coordinate system and the coordinates of the second joint feature center point of the respective second cell in the second coordinate system to obtain a respective pair of extracted coordinates (S220). In response to checking that that the at least one of the one or more first correlation conditions for the respective first cell and the respective second cell is not fulfilled (S210=no), the means for extracting 220 may not extract, for each of the first cells and each of the second cells, the coordinates of the first joint feature center point of the respective first cell in the first coordinate system and the coordinates of the second joint feature center point of the respective second cell in the second coordinate system.

Based on the pairs of coordinates extracted in S220, the second means for calculating 230 calculates an estimated transformation between the first coordinate system and the second coordinate system (S230).

FIG. 8 shows an apparatus according to an example embodiment. The apparatus comprises at least one processor 810, at least one memory 820 storing instructions that, when executed by the at least one processor 810, cause the apparatus at least to perform the method according to FIG. 7.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example provide, for example, a neural network or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred example embodiments. However, it should be noted that the description of the preferred example embodiments is given by way of example only and that various modifications may be made without departing from the scope of the invention as defined by the appended claims or described by the appended technical clauses.

The terms “first X” and “second X” include the options that “first X” is the same as “second X” and that “first X” is different from “second X”, unless otherwise specified. As used herein, “at least one of the following: <a list of two or more elements>” and “at least one of <a list of two or more elements>” and similar wording, where the list of two or more elements are joined by “and” or “or”, mean at least any one of the elements, or at least any two or more of the elements, or at least all the elements.

TECHNICAL CLAUSES

Clause 1. Apparatus comprising:

one or more processors, and memory storing instructions that, when executed by the one or more processors, cause the apparatus to perform:

inputting a first 3D point cloud of a first modality and a first grid comprising one or more first cells into a first encoder layer, wherein coordinates of points of the first 3D point cloud are indicated in a first coordinate system;

encoding, by the first encoder layer, the first 3D point cloud of the first modality into a first encoded map of the first modality, wherein the first encoded map of the first modality comprises, for each of the first cells of the first grid, a respective first feature center point and a respective first feature vector, and the coordinates of the first feature center points are indicated in the first coordinate system;

inputting a first encoded input map into a first matching descriptor layer of a first hierarchical layer, wherein the first encoded input map is based on the first encoded map of the first modality and comprises, for each of the first cells, a respective first joint feature center point and a respective first input feature vector, wherein the coordinates of the first joint feature center points are indicated in the first coordinate system;

inputting a second 3D point cloud of the first modality and a second grid comprising one or more second cells into a second encoder layer, wherein the coordinates of points of the second 3D point cloud are indicated in a second coordinate system;

encoding, by the second encoder layer, the second 3D point cloud of the first modality into a second encoded map of the first modality, wherein the second encoded map of the first modality comprises, for each of the second cells of the second grid, a respective second feature center point and a respective second feature vector, and the coordinates of the second feature center points are indicated in the second coordinate system;

inputting a second encoded input map into the first matching descriptor layer, wherein the second encoded input map is based on the second encoded map of the first modality and comprises, for each of the second cells, a respective second joint feature center point and a respective second input feature vector, wherein the coordinates of the second joint feature center points are indicated in the second coordinate system;

adapting, by the first matching descriptor layer, each of the first input feature vectors based on the first input feature vectors, optionally with their first feature center points, and the second input feature vectors, optionally with their second feature center points, to obtain a first joint map, wherein the first joint map comprises, for each of the first joint feature center points, a respective first joint feature vector;

adapting, by the first matching descriptor layer, each of the second input feature vectors based on the first input feature vectors, optionally with their first feature center points, and the second input feature vectors, optionally with their second feature center points, to obtain a second joint map, wherein the second joint map comprises, for each of the second joint feature center points, a respective second joint feature vector;

calculating, by a first optimal matching layer, for each of the first cells and each of the second cells, a similarity between the first joint feature vector of the respective first cell and the second joint feature vector of the respective second cell;

calculating, by the first optimal matching layer, for each of the first cells and each of the second cells, a first point correlation between the respective first cell and the respective second cell based on the similarities between the first joint feature vector of the respective first cell and the second joint feature vectors of the second cells and based on the similarities between the second joint feature vector of the respective second cell and the first joint feature vectors of the first cells;

checking, for each of the first cells and each of the second cells, whether at least one of one or more first correlation conditions for the respective first cell and the respective second cell is fulfilled, wherein the one or more first correlation conditions comprise:

the first point correlation between the respective first cell and the respective second cell is larger than a first correlation threshold of the first hierarchical layer; or the first point correlation between the respective first cell and the respective second cell is among the largest k values of the first point correlations, and k is a fixed value;

extracting, for each of the first cells and each of the second cells, the coordinates of the first joint feature center point of the respective first cell in the first coordinate system and the coordinates of the second joint feature center point of the respective second cell in the second coordinate system to obtain a respective pair of extracted coordinates of the first hierarchical layer in response to checking that the at least one of the one or more first correlation conditions for the respective first cell and the respective second cell is fulfilled;

calculating an estimated transformation between the first coordinate system and the second coordinate system based on the pairs of extracted coordinates of the first hierarchical layer.

Clause 2. The apparatus according to clause 1, wherein the first encoder layer, the second encoder layer, and the first matching descriptor layer of the first hierarchical layer are configured by respective first parameters, and the instructions, when executed by the one or more processors, further cause the apparatus to perform training of the apparatus to determine the first parameters such that a deviation between the estimated transformation and a known transformation between the first coordinate system and the second coordinate system becomes less than a transformation estimation threshold and such that the first point correlations are increased.

Clause 3. The apparatus according to any of clauses 1 to 2, wherein the first modality comprises one of photographic images, LIDAR images, and ultrasound images.

Clause 4. The apparatus according to any of clauses 1 to 3, wherein the first encoder layer is the same as the second encoder layer.

Clause 5. The apparatus according to any of clauses 1 to 4, wherein the instructions, when executed by the one or more processors, further cause the apparatus to perform at least one of the following:

generating the first 3D point cloud based on a sequence of first images of the first modality, wherein a respective location in the first coordinate system is associated to each of the first images; or generating the second 3D point cloud based on a sequence of second images of the first modality, wherein a respective location in the second coordinate system is associated to each of the second images.

Clause 6. The apparatus according to any of clauses 1 to 5, wherein the first encoded input map is the first encoded map, the first joint feature center points are the first feature center points, the second encoded input map is the second encoded map, and the second joint feature center points are the second feature center points.

Clause 7. The apparatus according to any of clauses 1 to 5, wherein the instructions, when executed by the one or more processors, further cause the apparatus to perform inputting a third 3D point cloud of a second modality and the first grid into a third encoder layer, wherein the coordinates of points of the third 3D point cloud are indicated in the first coordinate system, and the second modality is different from the first modality;

encoding, by the third encoder layer, the third 3D point cloud of the second modality into a third encoded map of the second modality, wherein the third encoded map of the second modality comprises, for each of the first cells of the first grid, a respective third feature center point and a respective third feature vector, and the coordinates of the third feature center points are indicated in the first coordinate system;

inputting the third encoded map into a first neural fusion layer;

inputting the first encoded map into the first neural fusion layer;

generating, by the first neural fusion layer, based on the first encoded map and the third encoded map, the first encoded input map, wherein, for each of the first cells, the respective first joint feature center point is based on the first feature center point of the respective first cell and the third feature center point of the respective first cell, and the respective first input feature vector is based on the first feature vector and optionally the first feature center point of the respective first cell adapted based on the first feature vectors optionally with their first feature center points and the third feature vectors, optionally with their third feature center points, and based on the third feature vector and optionally the third feature center point of the respective first cell adapted by the first feature vectors, optionally with their first feature center points, and the third feature vectors, optionally with their third feature center points;

inputting a fourth 3D point cloud of the second modality and the second grid into a fourth encoder layer, wherein the coordinates of points of the fourth 3D point cloud are indicated in the second coordinate system;

encoding, by the fourth encoder layer, the fourth 3D point cloud of the second modality into a fourth encoded map of the second modality, wherein the fourth encoded map of the second modality comprises, for each of the second cells of the second grid, a respective fourth feature center point and a respective fourth feature vector, and the coordinates of the fourth feature center points are indicated in the second coordinate system;

inputting the fourth encoded map into a second neural fusion layer;

inputting the second encoded map into the second neural fusion layer;

generating, by the second neural fusion layer, based on the second encoded map and the fourth encoded map, the second encoded input map, wherein, for each of the second cells, the respective second joint feature center point is based on the second feature center point of the respective second cell and the fourth feature center point of the respective second cell, and the respective second input feature vector is based on the second feature vector and optionally the second feature center point of the respective second cell adapted by the second feature vectors, optionally with their second feature center points, and the fourth feature vectors, optionally with their fourth feature center points, and based on the fourth feature vector and optionally the fourth feature center point of the respective second cell adapted by the second feature vectors, optionally with their second feature center points, and the fourth feature vectors, optionally with their fourth feature center points.

Clause 8. The apparatus according to clause 7, wherein: the second modality comprises at least one of photographic images, RF fingerprints, LIDAR images, or ultrasound images.

Clause 9. The apparatus according to any of clauses 7 to 8 dependent on clause 2 wherein the third encoder layer, the fourth encoder layer, the first neural fusion layer, and the second neural fusion layer are configured by respective second parameters, and the instructions, when executed by the one or more processors, further cause the apparatus to perform the training of the apparatus to determine the first and second parameters such that the deviation between the estimated transformation and the known transformation between the first coordinate system and the second coordinate system becomes less than the transformation estimation threshold and such that the first point correlations are increased.

Clause 10. The apparatus according to any of clauses 7 to 9 dependent on clause 6, wherein the first images are taken by a first sensor of a first sensor device;

the second images are taken by a second sensor of a second sensor device; and the instructions, when executed by the one or more processors, further cause the apparatus to perform conducting a plurality of first measurements of the second modality with a third sensor of the first sensor device;

conducting a plurality of second measurements of the second modality with a fourth sensor of the second sensor device;

generating the third 3D point cloud of the second modality based on the plurality of first measurements, the locations associated to the first images, and a calibration between the first sensor of the first sensor device and the third sensor of the first sensor device;

generating the fourth 3D point cloud of the second modality based on the plurality of second measurements, the locations associated to the second images, and a calibration between the second sensor of the second sensor device and the fourth sensor of the second sensor device.

Clause 11. The apparatus according to any of clauses 7 to 10, wherein at least one of the following:

the third encoder layer is the same as the fourth encoder layer; or the first neural fusion layer is the same as the second neural fusion layer.

Clause 12. The apparatus according to any of clauses 1 to 11, wherein the instructions, when executed by the one or more processors, further cause the apparatus to perform inputting the first encoded map of the first modality and a third grid comprising one or more third cells into a fifth encoder layer, wherein each of the third cells comprises respective two or more of the first cells, and the first grid comprises two or more of the first cells;

encoding, by the fifth encoder layer, the first encoded map of the first modality into a fifth encoded map of the first modality, wherein the fifth encoded map of the first modality comprises, for each of the third cells of the third grid, a respective fifth feature center point and a respective fifth feature vector, and the coordinates of the fifth feature center points are indicated in the first coordinate system;

inputting a third encoded input map into a second matching descriptor layer of a second hierarchical layer, wherein the third encoded input map is based on the fifth encoded map of the first modality and comprises, for each of the third cells, a respective third joint feature center point and a respective third input feature vector, wherein the coordinates of the third joint feature center points are indicated in the first coordinate system;

inputting the second encoded map of the first modality and a fourth grid comprising one or more fourth cells into a sixth encoder layer, wherein each of the fourth cells comprises respective two or more of the second cells, and the second grid comprises two or more of the second cells;

encoding, by the sixth encoder layer, the second encoded map of the first modality into a sixth encoded map of the first modality, wherein the sixth encoded map of the first modality comprises, for each of the fourth cells of the fourth grid, a respective sixth feature center point and a respective sixth feature vector, and the coordinates of the sixth feature center points are indicated in the second coordinate system;

inputting a fourth encoded input map into the second matching descriptor layer, wherein the fourth encoded input map is based on the sixth encoded map of the first modality and comprises, for each of the fourth cells, a respective fourth joint feature center point and a respective fourth input feature vector, wherein the coordinates of the fourth joint feature center points are indicated in the second coordinate system;

adapting, by the second matching descriptor layer, each of the third input feature vectors based on the third input feature vectors, optionally with their third joint feature center points, and the fourth input feature vectors, optionally with their fourth joint feature center points, to obtain a third joint map, wherein the third joint map comprises, for each of the third joint feature center points, a respective third joint feature vector;

adapting, by the second matching descriptor layer, each of the fourth input feature vectors based on the third input feature vectors, optionally with their third joint feature center points, and the fourth input feature vectors, optionally with their fourth joint feature center points, to obtain a fourth joint map, wherein the fourth joint map comprises, for each of the fourth joint feature center points, a respective fourth joint feature vector;

calculating, by a second optimal matching layer, for each of the third cells and each of the fourth cells, the similarity between the third joint feature vector of the respective third cell and the fourth joint feature vector of the respective fourth cell;

calculating, by the second optimal matching layer, for each of the third cells and each of the fourth cells, a second point correlation between the respective third cell and the respective fourth cell based on the similarities between the third joint feature vector of the respective third cell and the fourth joint feature vectors of the fourth cells and based on the similarities between the fourth joint feature vector of the respective fourth cell and the third joint feature vectors of the third cells;

checking, for each of the third cells and each of the fourth cells, whether at least one of one or more second correlation conditions for the respective third cell and the respective fourth cell is fulfilled, wherein the one or more second correlation conditions comprise:

the second point correlation between the respective third cell and the respective fourth cell is larger than a second correlation threshold of the second hierarchical layer; or the second point correlation between the respective third cell and the respective fourth cell is among the largest l values of the second point correlations, and l is a fixed value.

Clause 13. The apparatus according to clause 12, wherein the instructions, when executed by the one or more processors, further cause the apparatus to perform inhibiting the first matching descriptor layer to check, for each of the first cells and each of the second cells, whether the first point correlation between the first joint feature vector of the respective first cell and the second joint feature vector of the respective second cell is larger than the first correlation threshold of the first hierarchical layer in response to checking that the at least one of the one or more second correlation conditions for the respective third cell and the respective fourth cell is fulfilled.

Clause 14. The apparatus according to any of clauses 12 and 13, wherein the instructions, when executed by the one or more processors, further cause the apparatus to perform extracting, for each of the third cells and each of the fourth cells, the coordinates of the third joint feature center point of the respective third cell in the first coordinate system and the coordinates of the fourth joint feature center point of the respective fourth cell in the second coordinate system to obtain a respective pair of extracted coordinates of the second hierarchical layer in response to checking that at least one of the one or more second correlation conditions for the respective third cell and the respective fourth cell is fulfilled;

calculating an estimated transformation between the first coordinate system and the second coordinate system based on the pairs of extracted coordinates of the first hierarchical layer and the pairs of extracted coordinates of the second hierarchical layer.

Clause 15. The apparatus according to clause 14, wherein the instructions, when executed by the one or more processors, further cause the apparatus to perform the calculating the estimated transformation such that the pairs of extracted coordinates of the first hierarchical layer have a different weight than the pairs of extracted coordinates of the second hierarchical layer in the calculating.

Clause 16. The apparatus according to any of clauses 12 to 14 dependent on clause 2, wherein the second matching descriptor layer of the second hierarchical layer is configured by respective third parameters, and the instructions, when executed by the one or more processors, further cause the apparatus to perform the training of the apparatus to determine the first and third parameters such that the deviation between the estimated transformation and the known transformation between the first coordinate system and the second coordinate system becomes less than the transformation estimation threshold and such that the first point correlations and the second point correlations are increased.

Clause 17. The apparatus according to any of clauses 12 to 16, wherein at least one of the following:

the fifth encoder layer is the same as the sixth encoder layer; or the fifth encoder layer is the same as the first encoder layer; or the sixth encoder layer is the same as the second encoder layer; or the second matching descriptor layer is the same as the first matching descriptor layer; or the second optimal matching layer is the same as the first optimal matching layer.

Clause 18. The apparatus according to any of clauses 12 to 17 directly or indirectly dependent on clause 6, wherein the third encoded input map is the third encoded map of the first modality, the third joint feature center points are the third feature center points, the fourth encoded input map is the fourth encoded map of the first modality, and the fourth joint feature center points are the fourth feature center points.

Clause 19. The apparatus according to any of clauses 12 to 17 dependent on any of clauses 7 to 11, wherein the instructions, when executed by the one or more processors, further cause the apparatus to perform inputting the third encoded map of the second modality and the third grid into a seventh encoder layer;

encoding, by the seventh encoder layer, the third encoded map of the second modality into a seventh encoded map of the second modality, wherein the seventh encoded map of the second modality comprises, for each of the third cells of the third grid, a respective seventh feature center point and a respective seventh feature vector, and the coordinates of the seventh feature center points are indicated in the first coordinate system;

inputting the seventh encoded map into a third neural fusion layer;

inputting the fifth encoded map into the third neural fusion layer;

generating, by the third neural fusion layer, based on the seventh encoded map and the fifth encoded map, the third encoded input map, wherein, for each of the third cells, the respective third joint feature center point is based on the fifth feature center point of the respective third cell and the seventh feature center point of the respective third cell, and the respective third input feature vector is based on the fifth feature vector of the respective third cell adapted by the fifth feature vectors and the seventh feature vectors and based on the seventh feature vector of the respective third cell adapted by the fifth feature vectors and the seventh feature vectors;

inputting the fourth encoded map of the second modality and the fourth grid into an eighth encoder layer;

encoding, by the eighth encoder layer, the fourth encoded map of the second modality into an eighth encoded map of the second modality, wherein the eighth encoded map of the second modality comprises, for each of the fourth cells of the fourth grid, a respective eighth feature center point and a respective eighth feature vector, and the coordinates of the eighth feature center points are indicated in the second coordinate system;

inputting the eighth encoded map into a fourth neural fusion layer;

inputting the sixth encoded map into the fourth neural fusion layer;

generating, by the fourth neural fusion layer, based on the sixth encoded map and the eighth encoded map, the fourth encoded input map, wherein, for each of the fourth cells, the respective fourth joint feature center point is based on the sixth feature center point of the respective fourth cell and the eighth feature center point of the respective fourth cell, and the respective fourth input feature vector is based on the sixth feature vector of the respective fourth cell adapted by the sixth feature vectors and the eighth feature vectors and based on the eighth feature vector of the respective fourth cell adapted by the sixth feature vectors and the eighth feature vectors.

Clause 20. The apparatus according to clause 19, wherein the instructions, when executed by the one or more processors, further cause the apparatus to perform at least one of:

inputting the first encoded input map into the fifth encoder layer and encoding, by the fifth encoder layer, the first encoded input map and the first encoded map of the first modality into the fifth encoded map of the first modality;

inputting the first encoded input map into the seventh encoder layer and encoding, by the seventh encoder layer, the first encoded input map and the third encoded map of the second modality into the seventh encoded map of the second modality;

inputting the second encoded input map into the sixth encoder layer and encoding, by the sixth encoder layer, the second encoded input map and the second encoded map of the first modality into the sixth encoded map of the first modality;

inputting the second encoded input map into the eighth encoder layer and encoding, by the eighth encoder layer, the second encoded input map and the fourth encoded map of the second modality into the eighth encoded map of the second modality.

Clause 21. The apparatus according to any of clauses 19 and 20 dependent on clause 9, wherein the second matching descriptor layer of the second hierarchical layer is configured by respective third parameters, and the instructions, when executed by the one or more processors, further cause the apparatus to perform the training of the apparatus to determine the first, second, and third parameters such that the deviation between the estimated transformation and the known transformation between the first coordinate system and the second coordinate system becomes less than the transformation estimation threshold and such that the first point correlations and the second point correlations are increased.

Clause 22. The apparatus according to any of clauses 12 to 20, wherein at least one of the following:

the seventh encoder layer is the same as the eighth encoder layer; or the seventh encoder layer is the same as the third encoder layer; or the eighth encoder layer is the same as the fourth encoder layer; or the third neural fusion layer is the same as the fourth neural fusion layer; or the third neural fusion layer is the same as the first neural fusion layer; or the fourth neural fusion layer is the same as the second neural fusion layer.

Clause 23. The apparatus according to any of clauses 1 to 22, wherein the instructions, when executed by the one or more processors, further cause the apparatus to perform at least one of the following:

re-localization of a second sequence of images of the second coordinate system in a first sequence of images of the first coordinate system based on the estimated transformation; or co-localization of a fourth sequence of images of the second coordinate system with a third sequence of images of the first coordinate system based on the estimated transformation; or loop closure of a portion of an image sequence with the entire image sequence based on the estimated transformation, wherein the locations of the images of the portion of the image sequence are indicated in the second coordinate system and the images of the entire image sequence are indicated in the first coordinate system.

Clause 24. Method comprising:

inputting a first 3D point cloud of a first modality and a first grid comprising one or more first cells into a first encoder layer, wherein coordinates of points of the first 3D point cloud are indicated in a first coordinate system;

encoding, by the first encoder layer, the first 3D point cloud of the first modality into a first encoded map of the first modality, wherein the first encoded map of the first modality comprises, for each of the first cells of the first grid, a respective first feature center point and a respective first feature vector, and the coordinates of the first feature center points are indicated in the first coordinate system;

inputting a first encoded input map into a first matching descriptor layer of a first hierarchical layer, wherein the first encoded input map is based on the first encoded map of the first modality and comprises, for each of the first cells, a respective first joint feature center point and a respective first input feature vector, wherein the coordinates of the first joint feature center points are indicated in the first coordinate system;

inputting a second 3D point cloud of the first modality and a second grid comprising one or more second cells into a second encoder layer, wherein the coordinates of points of the second 3D point cloud are indicated in a second coordinate system;

encoding, by the second encoder layer, the second 3D point cloud of the first modality into a second encoded map of the first modality, wherein the second encoded map of the first modality comprises, for each of the second cells of the second grid, a respective second feature center point and a respective second feature vector, and the coordinates of the second feature center points are indicated in the second coordinate system;

inputting a second encoded input map into the first matching descriptor layer, wherein the second encoded input map is based on the second encoded map of the first modality and comprises, for each of the second cells, a respective second joint feature center point and a respective second input feature vector, wherein the coordinates of the second joint feature center points are indicated in the second coordinate system;

adapting, by the first matching descriptor layer, each of the first input feature vectors based on the first input feature vectors, optionally with their first feature center points, and the second input feature vectors, optionally with their second feature center points, to obtain a first joint map, wherein the first joint map comprises, for each of the first joint feature center points, a respective first joint feature vector;

adapting, by the first matching descriptor layer, each of the second input feature vectors based on the first input feature vectors, optionally with their first feature center points, and the second input feature vectors, optionally with their second feature center points, to obtain a second joint map, wherein the second joint map comprises, for each of the second joint feature center points, a respective second joint feature vector;

calculating, by a first optimal matching layer, for each of the first cells and each of the second cells, a similarity between the first joint feature vector of the respective first cell and the second joint feature vector of the respective second cell;

calculating, by the first optimal matching layer, for each of the first cells and each of the second cells, a first point correlation between the respective first cell and the respective second cell based on the similarities between the first joint feature vector of the respective first cell and the second joint feature vectors of the second cells and based on the similarities between the second joint feature vector of the respective second cell and the first joint feature vectors of the first cells;

checking, for each of the first cells and each of the second cells, whether at least one of one or more first correlation conditions for the respective first cell and the respective second cell is fulfilled, wherein the one or more first correlation conditions comprise:

the first point correlation between the respective first cell and the respective second cell is larger than a first correlation threshold of the first hierarchical layer; or the first point correlation between the respective first cell and the respective second cell is among the largest k values of the first point correlations, and k is a fixed value;

extracting, for each of the first cells and each of the second cells, the coordinates of the first joint feature center point of the respective first cell in the first coordinate system and the coordinates of the second joint feature center point of the respective second cell in the second coordinate system to obtain a respective pair of extracted coordinates of the first hierarchical layer in response to checking that the at least one of the one or more first correlation conditions for the respective first cell and the respective second cell is fulfilled;

calculating an estimated transformation between the first coordinate system and the second coordinate system based on the pairs of extracted coordinates of the first hierarchical layer.

Clause 25. A computer program product comprising a set of instructions which, when executed on an apparatus, is configured to cause the apparatus to carry out the method according to clause 24.

The invention claimed is:

1. Apparatus comprising:

one or more processors, and memory storing instructions that, when executed by the one or more processors, cause the apparatus to perform:

inputting a first 3D point cloud of a first modality and a first grid comprising one or more first cells into a first encoder layer, wherein coordinates of points of the first 3D point cloud are indicated in a first coordinate system;

encoding, by the first encoder layer, the first 3D point cloud of the first modality into a first encoded map of the first modality, wherein the first encoded map of the first modality comprises, for each of the first cells of the first grid, a respective first feature center point and a respective first feature vector, and the coordinates of the first feature center points are indicated in the first coordinate system;

inputting a first encoded input map into a first matching descriptor layer of a first hierarchical layer, wherein the first encoded input map is based on the first encoded map of the first modality and comprises, for each of the first cells, a respective first joint feature center point and a respective first input feature vector, wherein the coordinates of the first joint feature center points are indicated in the first coordinate system;

inputting a second 3D point cloud of the first modality and a second grid comprising one or more second cells into a second encoder layer, wherein the coordinates of points of the second 3D point cloud are indicated in a second coordinate system;

encoding, by the second encoder layer, the second 3D point cloud of the first modality into a second encoded map of the first modality, wherein the second encoded map of the first modality comprises, for each of the second cells of the second grid, a respective second feature center point and a respective second feature vector, and the coordinates of the second feature center points are indicated in the second coordinate system;

inputting a second encoded input map into the first matching descriptor layer, wherein the second encoded input map is based on the second encoded map of the first modality and comprises, for each of the second cells, a respective second joint feature center point and a respective second input feature vector, wherein the coordinates of the second joint feature center points are indicated in the second coordinate system;

adapting, by the first matching descriptor layer, each of the first input feature vectors based on the first input feature vectors, with their first feature center points, and the second input feature vectors, with their second feature center points, to obtain a first joint map, wherein the first joint map comprises, for each of the first joint feature center points, a respective first joint feature vector;

adapting, by the first matching descriptor layer, each of the second input feature vectors based on the first input feature vectors, with their first feature center points, and the second input feature vectors, with their second feature center points, to obtain a second joint map, wherein the second joint map comprises, for each of the second joint feature center points, a respective second joint feature vector;

calculating, by a first optimal matching layer, for each of the first cells and each of the second cells, a similarity between the first joint feature vector of the respective first cell and the second joint feature vector of the respective second cell;

calculating, by the first optimal matching layer, for each of the first cells and each of the second cells, a first point correlation between the respective first cell and the respective second cell based on the similarities between the first joint feature vector of the respective first cell and the second joint feature vectors of the second cells and based on the similarities between the second joint feature vector of the respective second cell and the first joint feature vectors of the first cells;

checking, for each of the first cells and each of the second cells, whether at least one of one or more first correlation conditions for the respective first cell and the respective second cell is fulfilled, wherein the one or more first correlation conditions comprise:

the first point correlation between the respective first cell and the respective second cell is larger than a first correlation threshold of the first hierarchical layer; or the first point correlation between the respective first cell and the respective second cell is among the largest k values of the first point correlations, and k is a fixed value;

extracting, for each of the first cells and each of the second cells, the coordinates of the first joint feature center point of the respective first cell in the first coordinate system and the coordinates of the second joint feature center point of the respective second cell in the second coordinate system to obtain a respective pair of extracted coordinates of the first hierarchical layer in response to checking that the at least one of the one or more first correlation conditions for the respective first cell and the respective second cell is fulfilled;

calculating an estimated transformation between the first coordinate system and the second coordinate system based on the pairs of extracted coordinates of the first hierarchical layer; and wherein the first encoder layer, the second encoder layer, and the first matching descriptor layer of the first hierarchical layer are configured by respective first parameters, and the instructions, when executed by the one or more processors, further cause the apparatus to perform:

training of the apparatus for improved localization in different environments by determining the first parameters such that a deviation between the estimated transformation and a known transformation between the first coordinate system and the second coordinate system becomes less than a transformation estimation threshold and such that the first point correlations are increased.

2. The apparatus according to claim 1, wherein the first modality comprises one of photographic images, LIDAR images, and ultrasound images.

3. The apparatus according to claim 1, wherein the first encoder layer is the same as the second encoder layer.

4. The apparatus according to claim 1, wherein the instructions, when executed by the one or more processors, further cause the apparatus to perform at least one of the following:

generating the first 3D point cloud based on a sequence of first images of the first modality, wherein a respective location in the first coordinate system is associated to each of the first images; or generating the second 3D point cloud based on a sequence of second images of the first modality, wherein a respective location in the second coordinate system is associated to each of the second images.

5. The apparatus according to claim 1, wherein the first encoded input map is the first encoded map, the first joint feature center points are the first feature center points, the second encoded input map is the second encoded map, and the second joint feature center points are the second feature center points.

6. The apparatus according to claim 1, wherein the instructions, when executed by the one or more processors, further cause the apparatus to perform:

inputting a third 3D point cloud of a second modality and the first grid into a third encoder layer, wherein the coordinates of points of the third 3D point cloud are indicated in the first coordinate system, and the second modality is different from the first modality; encoding, by the third encoder layer, the third 3D point cloud of the second modality into a third encoded map of the second modality, wherein the third encoded map of the second modality comprises, for each of the first cells of the first grid, a respective third feature center point and a respective third feature vector, and the coordinates of the third feature center points are indicated in the first coordinate system;

inputting the third encoded map into a first neural fusion layer;

inputting the first encoded map into the first neural fusion layer;

generating, by the first neural fusion layer, based on the first encoded map and the third encoded map, the first encoded input map, wherein, for each of the first cells, the respective first joint feature center point is based on the first feature center point of the respective first cell and the third feature center point of the respective first cell, and the respective first input feature vector is based on the first feature vector and the first feature center point of the respective first cell adapted based on the first feature vectors with their first feature center points and the third feature vectors, with their third feature center points, and based on the third feature vector and the third feature center point of the respective first cell adapted by the first feature vectors, with their first feature center points, and the third feature vectors, with their third feature center points;

inputting a fourth 3D point cloud of the second modality and the second grid into a fourth encoder layer, wherein the coordinates of points of the fourth 3D point cloud are indicated in the second coordinate system;

encoding, by the fourth encoder layer, the fourth 3D point cloud of the second modality into a fourth encoded map of the second modality, wherein the fourth encoded map of the second modality comprises, for each of the second cells of the second grid, a respective fourth feature center point and a respective fourth feature vector, and the coordinates of the fourth feature center points are indicated in the second coordinate system;

inputting the fourth encoded map into a second neural fusion layer;

inputting the second encoded map into the second neural fusion layer;

generating, by the second neural fusion layer, based on the second encoded map and the fourth encoded map, the second encoded input map, wherein, for each of the second cells, the respective second joint feature center point is based on the second feature center point of the respective second cell and the fourth feature center point of the respective second cell, and the respective second input feature vector is based on the second feature vector and the second feature center point of the respective second cell adapted by the second feature vectors, with their second feature center points, and the fourth feature vectors, with their fourth feature center points, and based on the fourth feature vector and the fourth feature center point of the respective second cell adapted by the second feature vectors, with their second feature center points, and the fourth feature vectors, with their fourth feature center points.

7. The apparatus according to claim 6, wherein the second modality comprises at least one of photographic images, RF fingerprints, LIDAR images, or ultrasound images.

8. The apparatus according to claim 6, wherein the first encoder layer, the second encoder layer, and the first matching descriptor layer of the first hierarchical layer are configured by respective first parameters, and the instructions, when executed by the one or more processors, further cause the apparatus to perform training of the apparatus to determine the first parameters such that a deviation between the estimated transformation and a known transformation between the first coordinate system and the second coordinate system becomes less than a transformation estimation threshold and such that the first point correlations are increased, and wherein the third encoder layer, the fourth encoder layer, the first neural fusion layer, and the second neural fusion layer are configured by respective second parameters, and the instructions, when executed by the one or more processors, further cause the apparatus to perform the training of the apparatus to determine the first and second parameters such that the deviation between the estimated transformation and the known transformation between the first coordinate system and the second coordinate system becomes less than the transformation estimation threshold and such that the first point correlations are increased.

9. The apparatus according to claim 6, wherein the first encoded input map is the first encoded map, the first joint feature center points are the first feature center points, the second encoded input map is the second encoded map, and the second joint feature center points are the second feature center points, and wherein the first images are taken by a first sensor of a first sensor device;

the second images are taken by a second sensor of a second sensor device; and the instructions, when executed by the one or more processors, further cause the apparatus to perform conducting a plurality of first measurements of the second modality with a third sensor of the first sensor device;

conducting a plurality of second measurements of the second modality with a fourth sensor of the second sensor device;

generating the third 3D point cloud of the second modality based on the plurality of first measurements, the locations associated to the first images, and a calibration between the first sensor of the first sensor device and the third sensor of the first sensor device;

generating the fourth 3D point cloud of the second modality based on the plurality of second measurements, the locations associated to the second images, and a calibration between the second sensor of the second sensor device and the fourth sensor of the second sensor device.

10. The apparatus according to claim 6, wherein at least one of the following:

the third encoder layer is the same as the fourth encoder layer; or the first neural fusion layer is the same as the second neural fusion layer.

11. The apparatus according to claim 1, wherein the instructions, when executed by the one or more processors, further cause the apparatus to perform;

inputting the first encoded map of the first modality and a third grid comprising one or more third cells into a fifth encoder layer, wherein each of the third cells comprises respective two or more of the first cells, and the first grid comprises two or more of the first cells;

encoding, by the fifth encoder layer, the first encoded map of the first modality into a fifth encoded map of the first modality, wherein the fifth encoded map of the first modality comprises, for each of the third cells of the third grid, a respective fifth feature center point and a respective fifth feature vector, and the coordinates of the fifth feature center points are indicated in the first coordinate system;

inputting a third encoded input map into a second matching descriptor layer of a second hierarchical layer, wherein the third encoded input map is based on the fifth encoded map of the first modality and comprises, for each of the third cells, a respective third joint feature center point and a respective third input feature vector, wherein the coordinates of the third joint feature center points are indicated in the first coordinate system;

inputting the second encoded map of the first modality and a fourth grid comprising one or more fourth cells into a sixth encoder layer, wherein each of the fourth cells comprises respective two or more of the second cells, and the second grid comprises two or more of the second cells;

encoding, by the sixth encoder layer, the second encoded map of the first modality into a sixth encoded map of the first modality, wherein the sixth encoded map of the first modality comprises, for each of the fourth cells of the fourth grid, a respective sixth feature center point and a respective sixth feature vector, and the coordinates of the sixth feature center points are indicated in the second coordinate system;

inputting a fourth encoded input map into the second matching descriptor layer, wherein the fourth encoded input map is based on the sixth encoded map of the first modality and comprises, for each of the fourth cells, a respective fourth joint feature center point and a respective fourth input feature vector, wherein the coordinates of the fourth joint feature center points are indicated in the second coordinate system;

adapting, by the second matching descriptor layer, each of the third input feature vectors based on the third input feature vectors, with their third joint feature center points, and the fourth input feature vectors, with their fourth joint feature center points, to obtain a third joint map, wherein the third joint map comprises, for each of the third joint feature center points, a respective third joint feature vector;

adapting, by the second matching descriptor layer, each of the fourth input feature vectors based on the third input feature vectors, with their third joint feature center points, and the fourth input feature vectors, with their fourth joint feature center points, to obtain a fourth joint map, wherein the fourth joint map comprises, for each of the fourth joint feature center points, a respective fourth joint feature vector;

calculating, by a second optimal matching layer, for each of the third cells and each of the fourth cells, the similarity between the third joint feature vector of the respective third cell and the fourth joint feature vector of the respective fourth cell;

calculating, by the second optimal matching layer, for each of the third cells and each of the fourth cells, a second point correlation between the respective third cell and the respective fourth cell based on the similarities between the third joint feature vector of the respective third cell and the fourth joint feature vectors of the fourth cells and based on the similarities between the fourth joint feature vector of the respective fourth cell and the third joint feature vectors of the third cells;

checking, for each of the third cells and each of the fourth cells, whether at least one of one or more second correlation conditions for the respective third cell and the respective fourth cell is fulfilled, wherein the one or more second correlation conditions comprise:

the second point correlation between the respective third cell and the respective fourth cell is larger than a second correlation threshold of the second hierarchical layer; or the second point correlation between the respective third cell and the respective fourth cell is among the largest 1 values of the second point correlations, and 1 is a fixed value.

12. The apparatus according to claim 11, wherein the instructions, when executed by the one or more processors, further cause the apparatus to perform inhibiting the first matching descriptor layer to check, for each of the first cells and each of the second cells, whether the first point correlation between the first joint feature vector of the respective first cell and the second joint feature vector of the respective second cell is larger than the first correlation threshold of the first hierarchical layer in response to checking that the at least one of the one or more second correlation conditions for the respective third cell and the respective fourth cell is fulfilled.

13. A method comprising:

inputting a first 3D point cloud of a first modality and a first grid comprising one or more first cells into a first encoder layer, wherein coordinates of points of the first 3D point cloud are indicated in a first coordinate system;

encoding, by the first encoder layer, the first 3D point cloud of the first modality into a first encoded map of the first modality, wherein the first encoded map of the first modality comprises, for each of the first cells of the first grid, a respective first feature center point and a respective first feature vector, and the coordinates of the first feature center points are indicated in the first coordinate system;

inputting a first encoded input map into a first matching descriptor layer of a first hierarchical layer, wherein the first encoded input map is based on the first encoded map of the first modality and comprises, for each of the first cells, a respective first joint feature center point and a respective first input feature vector, wherein the coordinates of the first joint feature center points are indicated in the first coordinate system;

inputting a second 3D point cloud of the first modality and a second grid comprising one or more second cells into a second encoder layer, wherein the coordinates of points of the second 3D point cloud are indicated in a second coordinate system;

encoding, by the second encoder layer, the second 3D point cloud of the first modality into a second encoded map of the first modality, wherein the second encoded map of the first modality comprises, for each of the second cells of the second grid, a respective second feature center point and a respective second feature vector, and the coordinates of the second feature center points are indicated in the second coordinate system;

inputting a second encoded input map into the first matching descriptor layer, wherein the second encoded input map is based on the second encoded map of the first modality and comprises, for each of the second cells, a respective second joint feature center point and a respective second input feature vector, wherein the coordinates of the second joint feature center points are indicated in the second coordinate system;

adapting, by the first matching descriptor layer, each of the first input feature vectors based on the first input feature vectors, with their first feature center points, and the second input feature vectors, with their second feature center points, to obtain a first joint map, wherein the first joint map comprises, for each of the first joint feature center points, a respective first joint feature vector;

adapting, by the first matching descriptor layer, each of the second input feature vectors based on the first input feature vectors, with their first feature center points, and the second input feature vectors, with their second feature center points, to obtain a second joint map, wherein the second joint map comprises, for each of the second joint feature center points, a respective second joint feature vector;

calculating, by a first optimal matching layer, for each of the first cells and each of the second cells, a similarity between the first joint feature vector of the respective first cell and the second joint feature vector of the respective second cell;

calculating, by the first optimal matching layer, for each of the first cells and each of the second cells, a first point correlation between the respective first cell and the respective second cell based on the similarities between the first joint feature vector of the respective first cell and the second joint feature vectors of the second cells and based on the similarities between the second joint feature vector of the respective second cell and the first joint feature vectors of the first cells;

checking, for each of the first cells and each of the second cells, whether at least one of one or more first correlation conditions for the respective first cell and the respective second cell is fulfilled, wherein the one or more first correlation conditions comprise:

the first point correlation between the respective first cell and the respective second cell is larger than a first correlation threshold of the first hierarchical layer; or the first point correlation between the respective first cell and the respective second cell is among the largest k values of the first point correlations, and k is a fixed value;

extracting, for each of the first cells and each of the second cells, the coordinates of the first joint feature center point of the respective first cell in the first coordinate system and the coordinates of the second joint feature center point of the respective second cell in the second coordinate system to obtain a respective pair of extracted coordinates of the first hierarchical layer in response to checking that the at least one of the one or more first correlation conditions for the respective first cell and the respective second cell is fulfilled;

calculating an estimated transformation between the first coordinate system and the second coordinate system based on the pairs of extracted coordinates of the first hierarchical layer.

14. A non-transitory computer readable medium comprising program instructions that, when executed by an apparatus, cause the apparatus to perform at least the following:

inputting a first 3D point cloud of a first modality and a first grid comprising one or more first cells into a first encoder layer, wherein coordinates of points of the first 3D point cloud are indicated in a first coordinate system;

encoding, by the first encoder layer, the first 3D point cloud of the first modality into a first encoded map of the first modality, wherein the first encoded map of the first modality comprises, for each of the first cells of the first grid, a respective first feature center point and a respective first feature vector, and the coordinates of the first feature center points are indicated in the first coordinate system;

inputting a first encoded input map into a first matching descriptor layer of a first hierarchical layer, wherein the first encoded input map is based on the first encoded map of the first modality and comprises, for each of the first cells, a respective first joint feature center point and a respective first input feature vector, wherein the coordinates of the first joint feature center points are indicated in the first coordinate system;

inputting a second 3D point cloud of the first modality and a second grid comprising one or more second cells into a second encoder layer, wherein the coordinates of points of the second 3D point cloud are indicated in a second coordinate system;

encoding, by the second encoder layer, the second 3D point cloud of the first modality into a second encoded map of the first modality, wherein the second encoded map of the first modality comprises, for each of the second cells of the second grid, a respective second feature center point and a respective second feature vector, and the coordinates of the second feature center points are indicated in the second coordinate system;

inputting a second encoded input map into the first matching descriptor layer, wherein the second encoded input map is based on the second encoded map of the first modality and comprises, for each of the second cells, a respective second joint feature center point and a respective second input feature vector, wherein the coordinates of the second joint feature center points are indicated in the second coordinate system;

adapting, by the first matching descriptor layer, each of the first input feature vectors based on the first input feature vectors, with their first feature center points, and the second input feature vectors, with their second feature center points, to obtain a first joint map, wherein the first joint map comprises, for each of the first joint feature center points, a respective first joint feature vector;

adapting, by the first matching descriptor layer, each of the second input feature vectors based on the first input feature vectors, with their first feature center points, and the second input feature vectors, with their second feature center points, to obtain a second joint map, wherein the second joint map comprises, for each of the second joint feature center points, a respective second joint feature vector;

calculating, by a first optimal matching layer, for each of the first cells and each of the second cells, a similarity between the first joint feature vector of the respective first cell and the second joint feature vector of the respective second cell;

calculating, by the first optimal matching layer, for each of the first cells and each of the second cells, a first point correlation between the respective first cell and the respective second cell based on the similarities between the first joint feature vector of the respective first cell and the second joint feature vectors of the second cells and based on the similarities between the second joint feature vector of the respective second cell and the first joint feature vectors of the first cells;

checking, for each of the first cells and each of the second cells, whether at least one of one or more first correlation conditions for the respective first cell and the respective second cell is fulfilled, wherein the one or more first correlation conditions comprise:

the first point correlation between the respective first cell and the respective second cell is larger than a first correlation threshold of the first hierarchical layer; or the first point correlation between the respective first cell and the respective second cell is among the largest k values of the first point correlations, and k is a fixed value;

extracting, for each of the first cells and each of the second cells, the coordinates of the first joint feature center point of the respective first cell in the first coordinate system and the coordinates of the second joint feature center point of the respective second cell in the second coordinate system to obtain a respective pair of extracted coordinates of the first hierarchical layer in response to checking that the at least one of the one or more first correlation conditions for the respective first cell and the respective second cell is fulfilled;

calculating an estimated transformation between the first coordinate system and the second coordinate system based on the pairs of extracted coordinates of the first hierarchical layer.

* * * * *